US011927577B2

(12) United States Patent
Dobbyn et al.

(10) Patent No.: US 11,927,577 B2
(45) Date of Patent: Mar. 12, 2024

(54) CHEMICAL INDICATOR SOLUTION, APPARATUS, AND METHOD FOR DETERMINING CONCENTRATION OF A CHEMICAL WITHIN A FLUID SAMPLE

(71) Applicant: CS MEDICAL, LLC, Creedmoor, NC (US)

(72) Inventors: Gregory John Dobbyn, Creedmoor, NC (US); John Jans, Hillsborough, NC (US); Thomas Fischer, Hillsborough, NC (US); Robert Bailis, Cary, NC (US)

(73) Assignee: CS MEDICAL, LLC, Creedmoor, NC (US)

( * ) Notice: Subject to any disclaimer, the term of this patent is extended or adjusted under 35 U.S.C. 154(b) by 834 days.

(21) Appl. No.: 16/868,998

(22) Filed: May 7, 2020

(65) Prior Publication Data

US 2020/0355658 A1    Nov. 12, 2020

Related U.S. Application Data

(60) Provisional application No. 62/845,658, filed on May 9, 2019.

(51) Int. Cl.
  *G01N 31/22* (2006.01)
  *B01L 3/00* (2006.01)
  *G01N 21/78* (2006.01)

(52) U.S. Cl.
  CPC .............. *G01N 31/22* (2013.01); *B01L 3/502* (2013.01); *G01N 21/78* (2013.01); *B01L 2300/0627* (2013.01); *B01L 2300/0867* (2013.01); *B01L 2400/0487* (2013.01); *B01L 2400/0666* (2013.01)

(58) Field of Classification Search
  CPC ......... G01N 31/22; G01N 21/78; B01L 3/502
  See application file for complete search history.

(56) References Cited

U.S. PATENT DOCUMENTS

| 6,203,767 B1 | 3/2001 | Leasko |
| 6,558,529 B1 | 5/2003 | McVey et al. |
| 8,246,909 B2 | 8/2012 | Williams et al. |
| 2005/0215906 A1* | 9/2005 | Coles ........................ A61L 2/24 600/459 |
| 2016/0158519 A1 | 6/2016 | Rhinehart et al. |

* cited by examiner

*Primary Examiner* — Brian R Gordon
*Assistant Examiner* — Dwan A Gerido
(74) *Attorney, Agent, or Firm* — Moore & Van Allen PLLC; Jeffrey R. Gray

(57) ABSTRACT

A chemical indicator solution, an apparatus, and a method for determining concentration of a chemical analyte is provided. In particular, the apparatus provides a simplified and low cost way to determine that a fluid sample contains a minimum recommended concentration of a chemical. Rather than using complex and expensive components or error-prone manual methods to prepare the solution and measure chemical concentrations, the apparatus may allow for the automatic measuring and mixing of the chemical components of the resulting solution through the unique geometry and layout of the apparatus. The resulting solution may contain a chemical indicator which allows for the detection of the concentration of the chemical analyte within the resulting solution using techniques such as color analysis.

19 Claims, 29 Drawing Sheets

CHEMICAL INDICATOR SOLUTION, APPARATUS, AND METHOD FOR DETERMINING CONCENTRATION OF A CHEMICAL WITHIN A FLUID SAMPLE

CROSS REFERENCE AND PRIORITY CLAIM UNDER 35 U.S.C. § 119

The present application for a patent claims priority to U.S. Provisional Patent Application Ser. No. 62/845,658 entitled "Chemical Indicator Solution, Apparatus, And Method For Determining Concentration Of A Chemical Within A Fluid Sample," filed on May 9, 2019 and assigned to the assignees hereof and hereby expressly incorporated by reference herein.

FIELD

The disclosure relates generally to chemical sample measurement systems and, more particularly, relates to an apparatus and method for determining a minimum recommended concentration of a chemical using a chemical indicator. The disclosure further relates to a chemical indicator solution which may be used with the apparatus as described herein.

BACKGROUND

The ability to accurately determine the concentration of a chemical within a fluid sample is desirable in a number of technical contexts. For example, during the preparation of a disinfectant in a fluid solution, it is important that the resulting disinfectant solution contains a sufficiently high concentration of the disinfectant (e.g., a "Minimum Recommended Concentration", hereinafter "MRC") to ensure the efficacy of the disinfectant solution. Some conventional methods of determining that a solution contains an MRC of a solute may require the use of a complex, costly system, which may include precision metering pumps, valves, and/or fluid level sensors with various moving parts. Other conventional methods for determining an MRC may involve manual testing of the solution via colored test strips, which introduces a large margin of error due to its subjective nature.

BRIEF SUMMARY OF EMBODIMENTS OF THE INVENTION

The following is a brief summary of the invention and is not intended to limit the scope of the invention.

The disclosure herein presents a novel apparatus and method to address the technical needs as described above, among others. In particular, the apparatus provides a simplified and low cost way to determine that a fluid sample contains an MRC of a chemical. Rather than using complex and expensive components or error-prone manual methods to prepare the solution and measure chemical concentrations, the apparatus may allow for the automated measuring, mixing, and draining of the chemical components of the disinfectant solution, the chemical indicator, and/or the resulting solution through the unique geometry and layout of the apparatus.

The disclosure further presents a chemical indicator solution which allows for the detection of the concentration of the chemical analyte within the resulting solution using techniques such as color analysis, or the like as will be described herein. In particular, the chemical indicator solution may comprise a reducing agent which reacts with the disinfectant compound (e.g., peracids such as peracetic acid) in a reduction reaction. The chemical indicator solution may further comprise a detector reagent which, through a colorimetric reaction, converts any remaining disinfectant compound from a colorless form to a colored form. In this way, by setting the concentration of the reducing agent to the MRC, the chemical indicator solution provides a way to detect whether a disinfectant solution contains the minimum level of disinfectant through colorimetric analysis.

Though it is within the scope of the present disclosure for the apparatus and/or the chemical indicator solution to be used in a wide variety of contexts, some embodiments are particularly useful when used to disinfect medical devices that are used in areas of the patient which are especially sensitive to pathogens. Examples of such medical devices may include TEE probes, endoscopes, endocavity ultrasound probes, surface ultrasound probes, cystoscopies, duodenoscopes, ureteroscopes, or the like.

Accordingly, embodiments of the disclosure provide for an apparatus for determining concentrations of disinfectants. The apparatus may comprise a housing comprising a first housing portion comprising a first fluid intake port, wherein the first fluid intake port receives a first fluid; and a first fluid chamber formed by the first housing portion, wherein the first fluid chamber receives the first fluid through the first fluid intake port; and a mixing cavity, wherein, the mixing cavity receives the first fluid from the first fluid chamber and a second fluid to form a fluid mixture.

In some embodiments, the apparatus further comprises a sensor operatively coupled to the mixing cavity, wherein the sensor is configured to detect a concentration of a chemical within the fluid mixture within the mixing cavity.

In some embodiments, the sensor is a color sensor configured to detect absorbance of the fluid mixture at specified wavelengths.

In some embodiments, the mixing cavity is formed by a portion of the sensor and is located apart from the housing.

In some embodiments, the mixing cavity is formed by a portion of the housing.

In some embodiments, the housing further comprises a second housing portion comprising a second fluid intake port, wherein the second fluid intake port receives the second fluid; a second fluid chamber formed by the second housing portion, wherein the second fluid chamber receives the second fluid through the second fluid intake port; a first piston oriented to extend into and withdraw from the first fluid chamber; and a second piston oriented to extend into and withdraw from the second fluid chamber; wherein the mixing cavity receives the second fluid from the second fluid chamber.

In some embodiments, the first piston and the second piston are mounted on a mounting block, wherein the mounting block is coupled to a shaft, wherein the shaft is coupled to a mechanical actuator.

In some embodiments, the housing further comprises one or more limits switches configured to signal a limit of travel of the first piston or the second piston.

In some embodiments, the first housing portion further comprises a third fluid intake port, wherein the first fluid chamber receives the second fluid through the second fluid intake port.

In some embodiments, one or more valves regulate when the first fluid chamber receives the first fluid or the second fluid.

In some embodiments, the first fluid chamber comprises a first measuring cavity, wherein the first fluid chamber receives the first fluid through the first fluid intake port when the housing is oriented in a first position, wherein the first measuring cavity of the first fluid chamber receives the first fluid, and wherein the mixing cavity receives the first fluid from the first measuring cavity when the housing is oriented in a second position for mixing with the second fluid to form the fluid mixture.

In some embodiments, the housing further comprises a second housing portion comprising a second fluid intake port, wherein the second fluid intake port receives the second fluid; a second fluid chamber formed by the second housing portion, the second fluid chamber comprising a second measuring cavity; and a divider, wherein the first housing portion and the second housing portion are operatively coupled and separated by the divider; wherein the second fluid chamber receives the second fluid through the second fluid intake port when the housing is oriented in the first position, wherein the second measuring cavity of the second fluid chamber receives the second fluid, wherein the mixing cavity receives the second fluid from the second measuring cavity when the housing is oriented in the second position, wherein the mixing cavity operatively couples the first fluid chamber and the second fluid chamber to mix the first fluid with the second fluid.

In some embodiments, the first fluid chamber further comprises a first residue cavity, wherein the first residue cavity captures an overflow of the first fluid from the first measuring cavity of the first fluid chamber, and wherein the second fluid chamber further comprises a second residue cavity, wherein the second residue cavity captures an overflow of the second fluid from the second measuring cavity of the second fluid chamber.

In some embodiments, the housing further comprises a fluid viewport, wherein the fluid viewport provides a view of the mixing cavity, and wherein the sensor comprises a circuit board comprising a color sensor configured to detect a color of the fluid mixture through the fluid viewport.

Embodiments of the disclosure also provide a system for determining concentrations of disinfectants, the system comprising an apparatus fluidly coupled to a first fluid source via a first fluid line through a first fluid intake port and to a second fluid source via a second fluid line through a second fluid intake port, wherein the apparatus receives a first fluid from the first fluid source and a second fluid from the second fluid source; and a sensor operatively coupled to the apparatus, wherein the sensor is configured to detect a concentration of a chemical within a fluid mixture created by mixing the first fluid with the second fluid.

In some embodiments, the apparatus comprises a housing comprising a first housing portion comprising the first fluid intake port; and a first fluid chamber formed by the first housing portion, wherein the first fluid chamber receives the first fluid through the first fluid intake port; a second housing portion comprising the second fluid intake port, wherein the second fluid intake port receives the second fluid; a second fluid chamber formed by the second housing portion, wherein the second fluid chamber receives the second fluid through the second fluid intake port; a first piston oriented to extend into and withdraw from the first fluid chamber; and a second piston oriented to extend into and withdraw from the second fluid chamber; and a mixing cavity, wherein, the mixing cavity receives the first fluid from the first fluid chamber and the second fluid from the second fluid chamber and forms a fluid mixture within the mixing cavity.

In some embodiments, the mixing cavity is formed within the sensor, or wherein the mixing cavity is formed within the housing.

Embodiments of the disclosure also provide a method for determining concentrations of disinfectants, the method comprising receiving a first fluid in a first fluid chamber through a first fluid intake port located within a first housing portion of a housing; receiving a second fluid in a second fluid chamber through a second fluid intake port located within a second housing portion of the housing; mixing the first fluid with the second fluid in a mixing cavity to create a fluid mixture; detecting, via a sensor, a color of the fluid mixture; and based on detecting the color of the fluid mixture, determining a concentration of a chemical within the fluid mixture.

In some embodiments, receiving the first fluid comprises actuating a first piston to draw the first fluid into the first fluid chamber, wherein receiving the second fluid comprises actuating a second piston to draw the second fluid into the second fluid chamber, wherein creating the fluid mixture comprises actuating the first piston and the second piston to expel the first fluid from the first fluid chamber and the second fluid from the second fluid chamber through one or more outlet ports and into the mixing cavity.

In some embodiments, the method further comprises a priming phase, wherein the priming phase comprises: opening a first solenoid valve operatively coupled to a first fluid source and closing a second solenoid valve operatively coupled to a second fluid source; and actuating a pump to fill a first fluid line with the first fluid; and a purging phase, wherein the purging phase comprises: closing the first solenoid valve operatively coupled to the first fluid source and opening the second solenoid valve operatively coupled to the second fluid source; and actuating the pump to expel fluids from the first fluid chamber and the second fluid chamber.

To the accomplishment of the foregoing and the related ends, the one or more embodiments of the invention comprise the features hereinafter fully described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE SEVERAL VIEWS OF THE DRAWINGS

Figure 1:
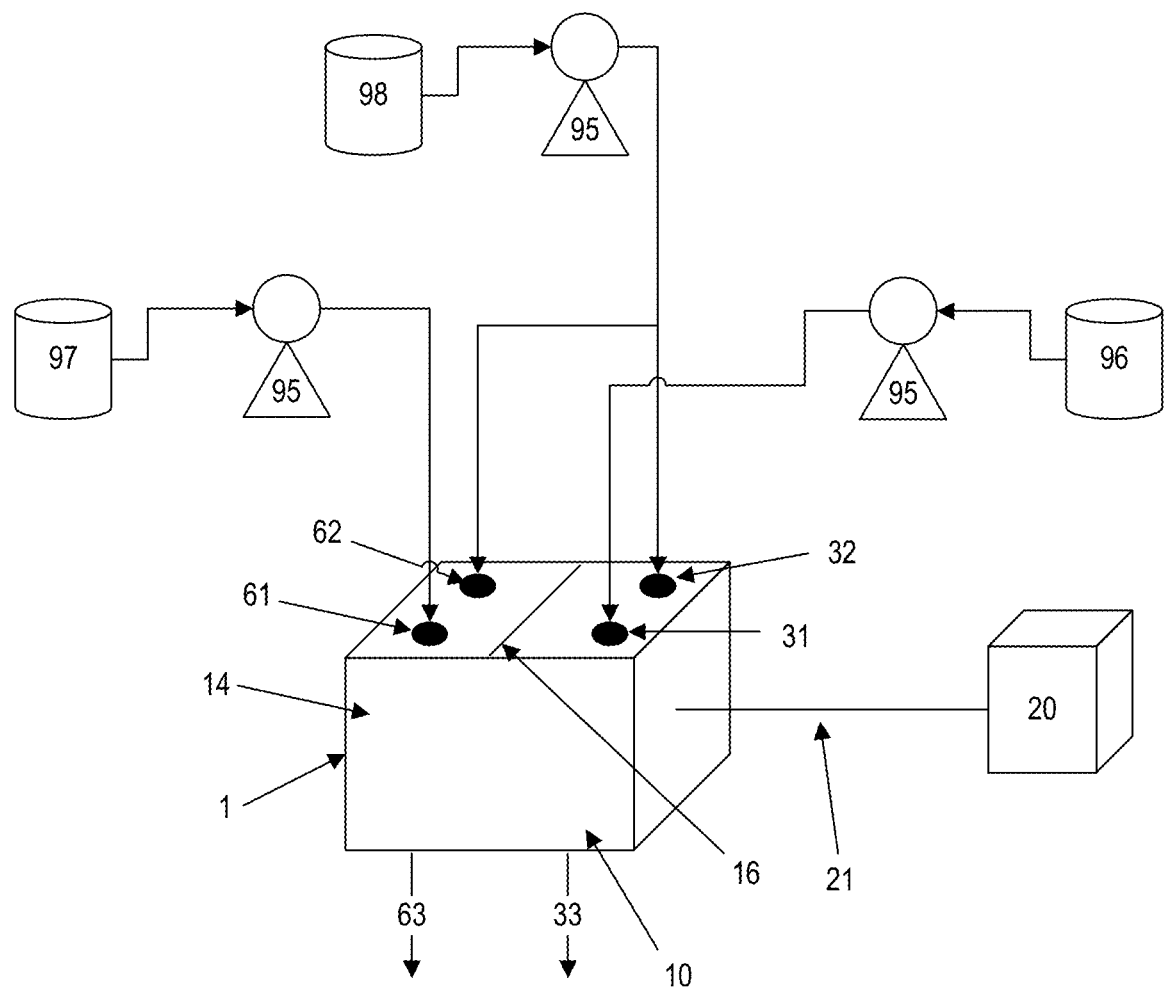

Having thus described embodiments of the invention in general terms, reference will now be made to the accompanying drawings, which are not necessarily drawn to scale, and wherein:

FIG. 1 is a schematic diagram illustrating a chemical indicator apparatus, in accordance with some embodiments of the present disclosure.

Figure 2:
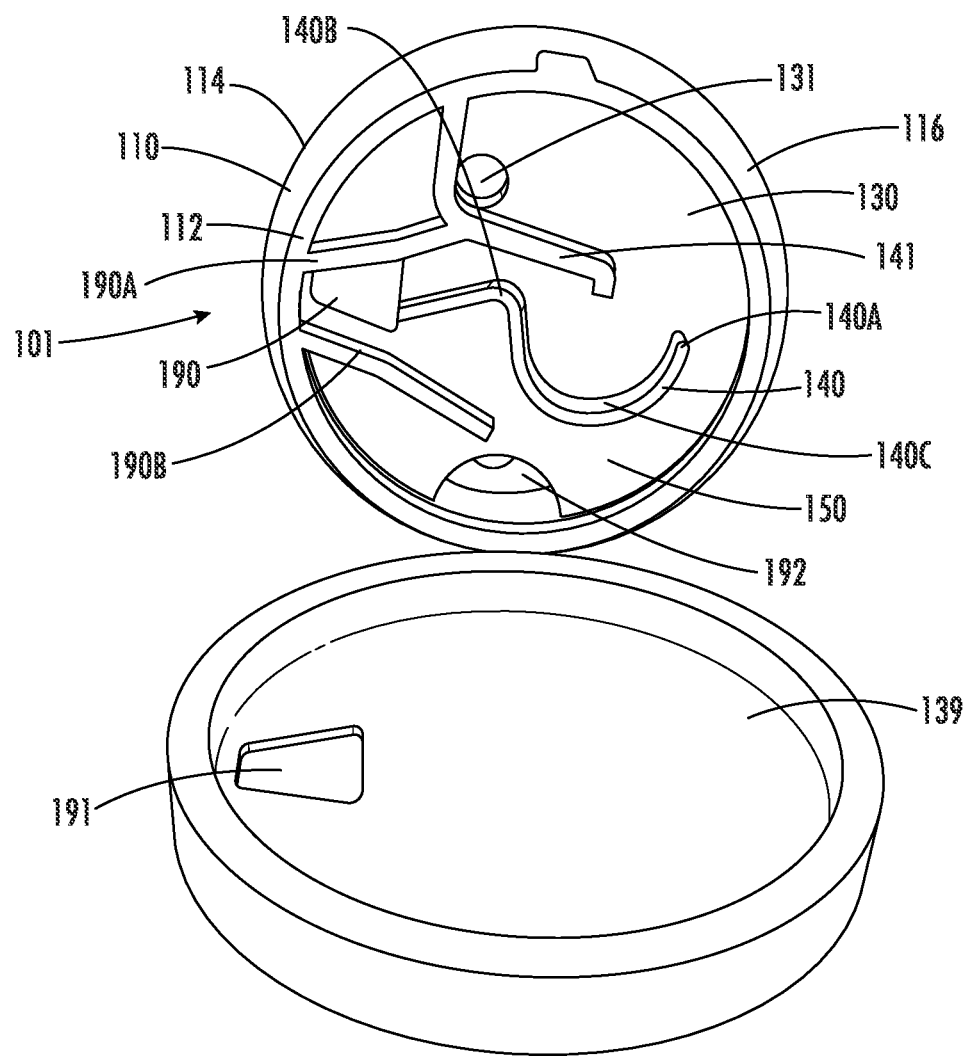

FIG. 2 is a perspective view illustrating interior portions of a first side of a chemical indicator apparatus, in accordance with some embodiments of the present disclosure.

Figure 3:
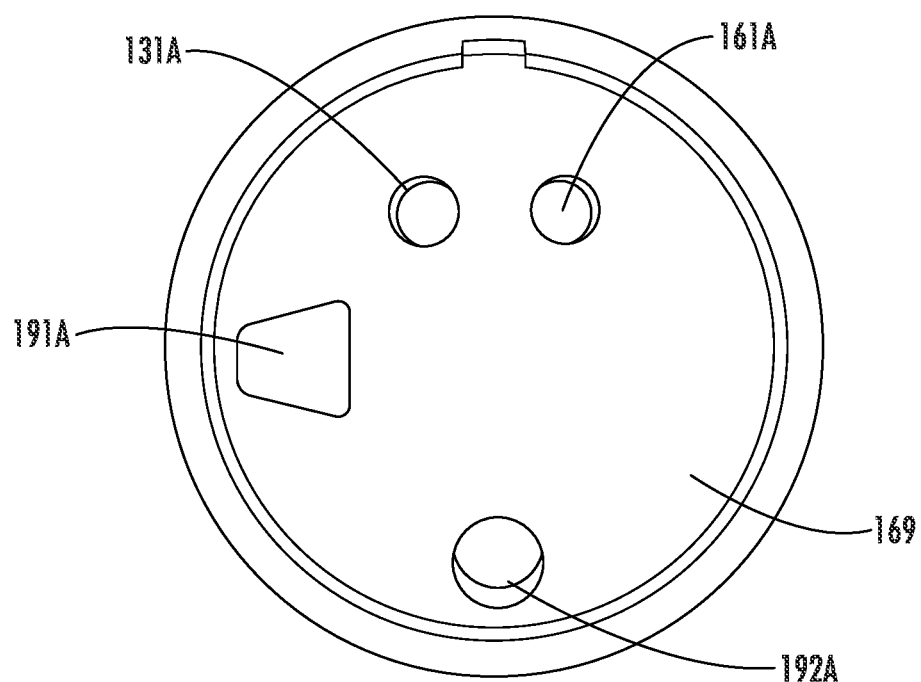

FIG. 3 is a perspective view illustrating a second end member of the chemical indicator apparatus, in accordance with some embodiments of the present disclosure.

Figure 4:
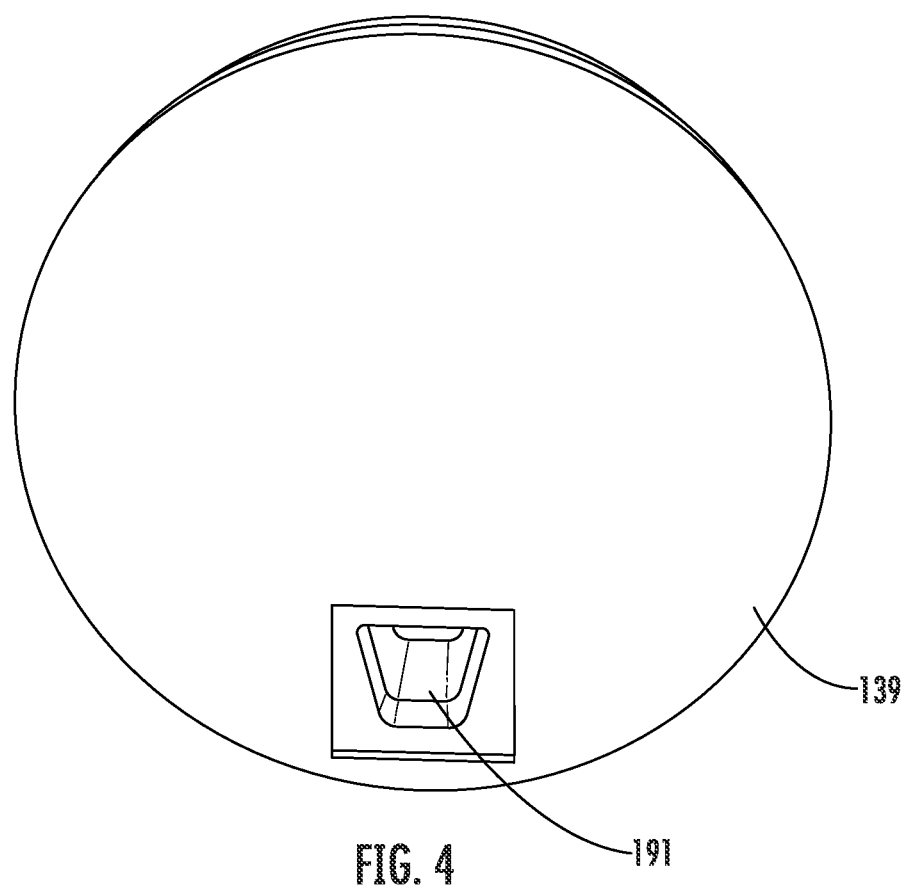

FIG. 4 is a perspective view illustrating the first side of the assembled chemical indicator apparatus, in accordance with some embodiments of the present disclosure.

Figure 5:
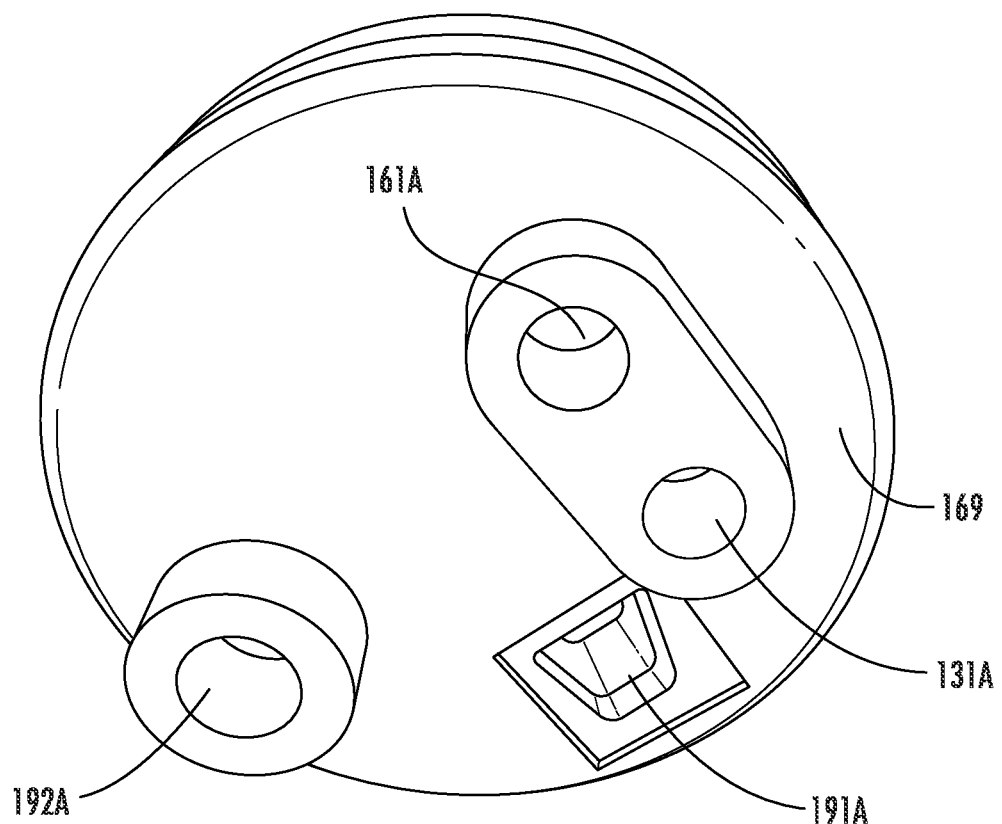

FIG. 5 is a perspective view illustrating the second side of the assembled chemical indicator apparatus, in accordance with some embodiments of the present disclosure.

Figure 6:
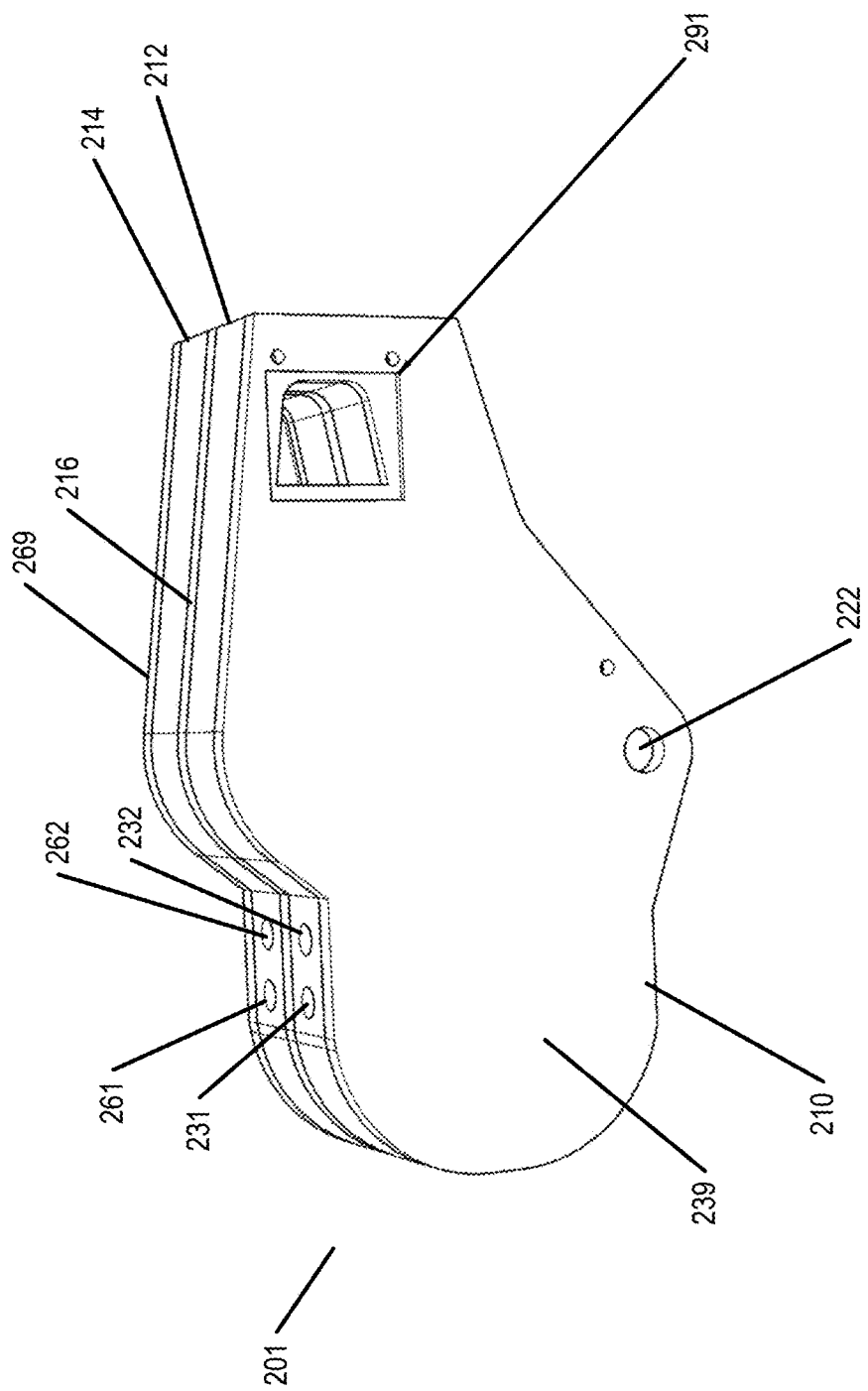

FIG. 6 is a perspective view illustrating the exterior view of a chemical indicator apparatus, in accordance with some embodiments of the present disclosure.

Figure 7:
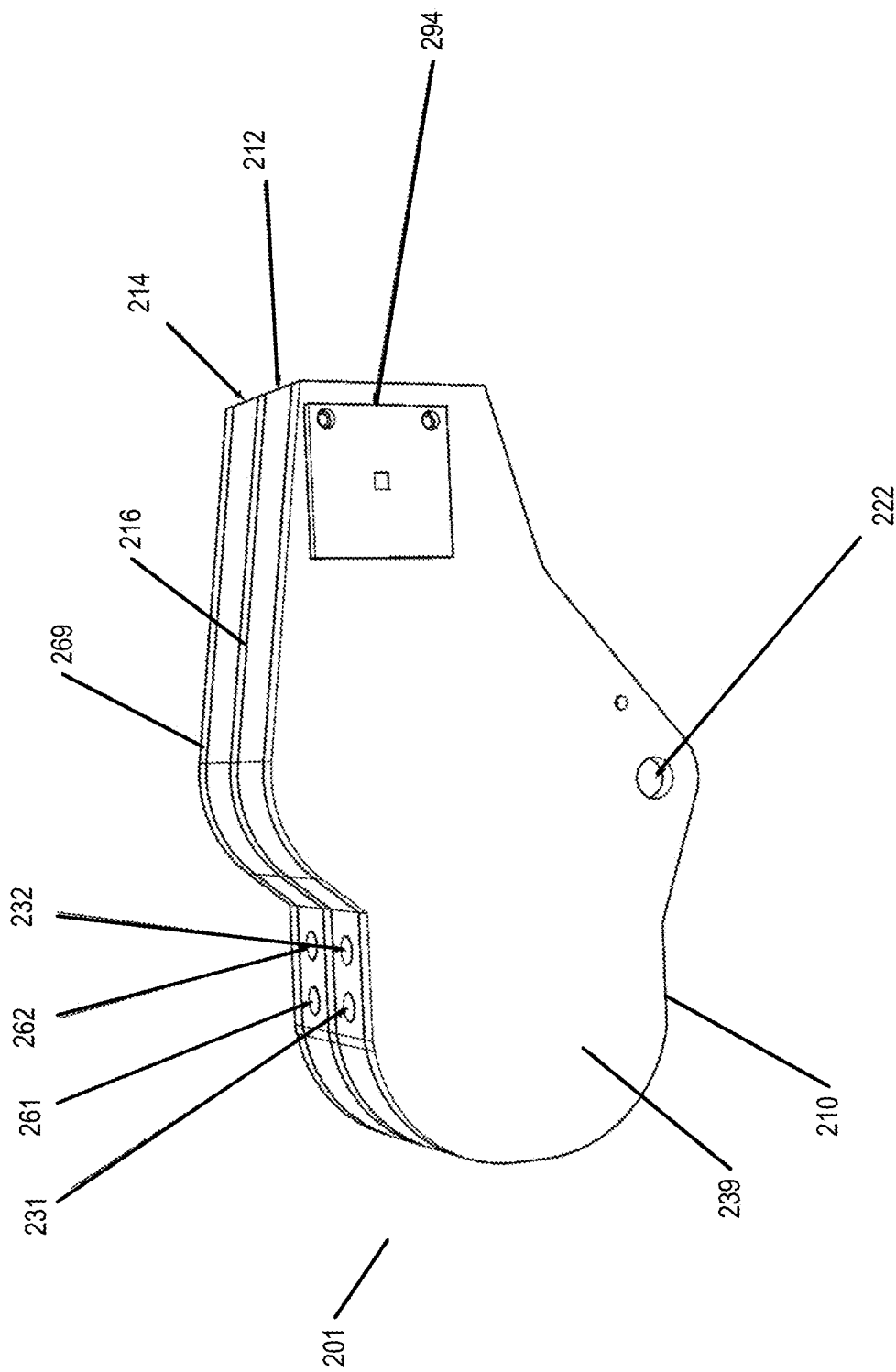

FIG. 7 is a perspective view illustrating the exterior view of the chemical indicator apparatus shown in FIG. 6, in accordance with some embodiments of the present disclosure.

Figure 8:
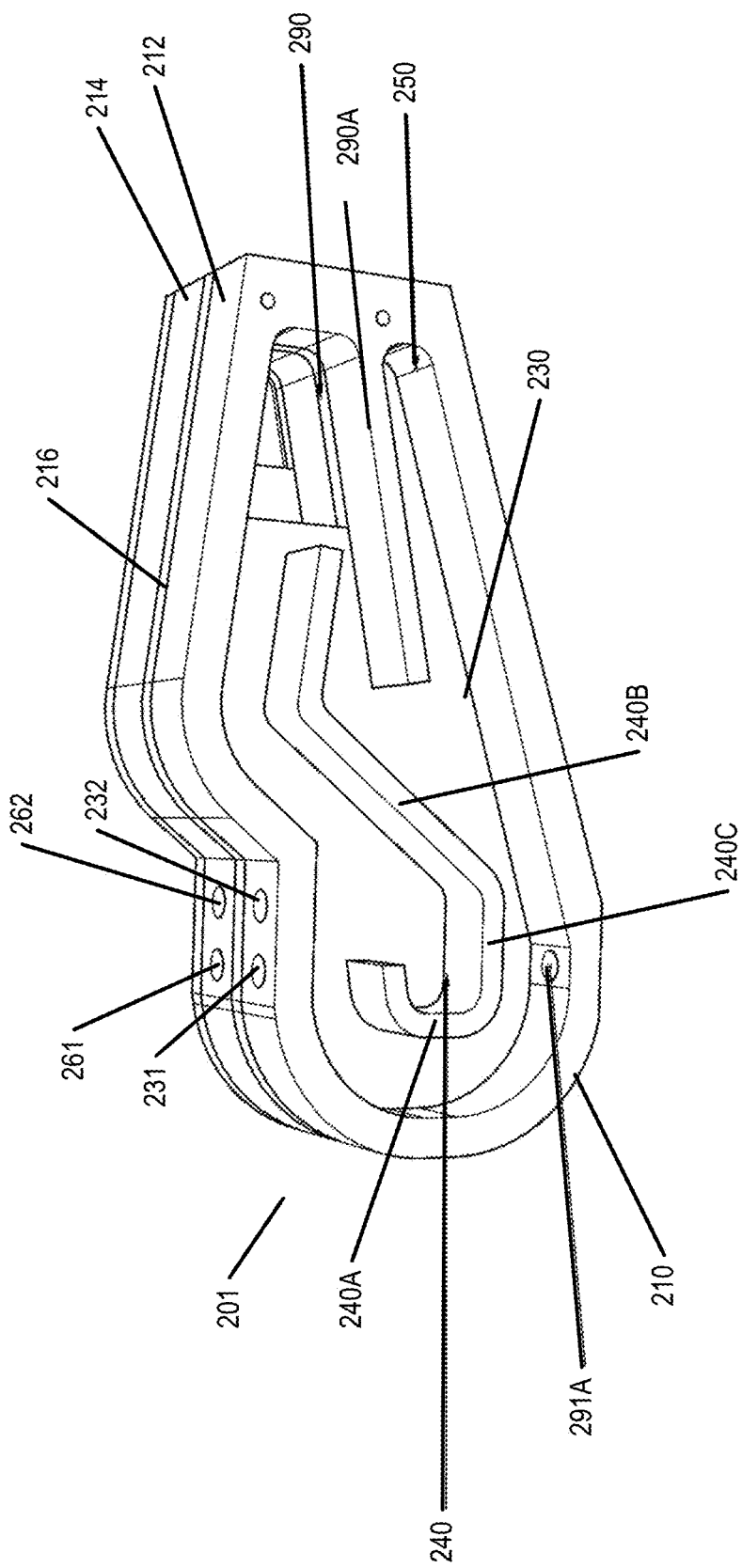

FIG. 8 is a perspective view illustrating an interior view of the first side of the chemical indicator apparatus in a first position, in accordance with some embodiments of the present disclosure.

Figure 9:
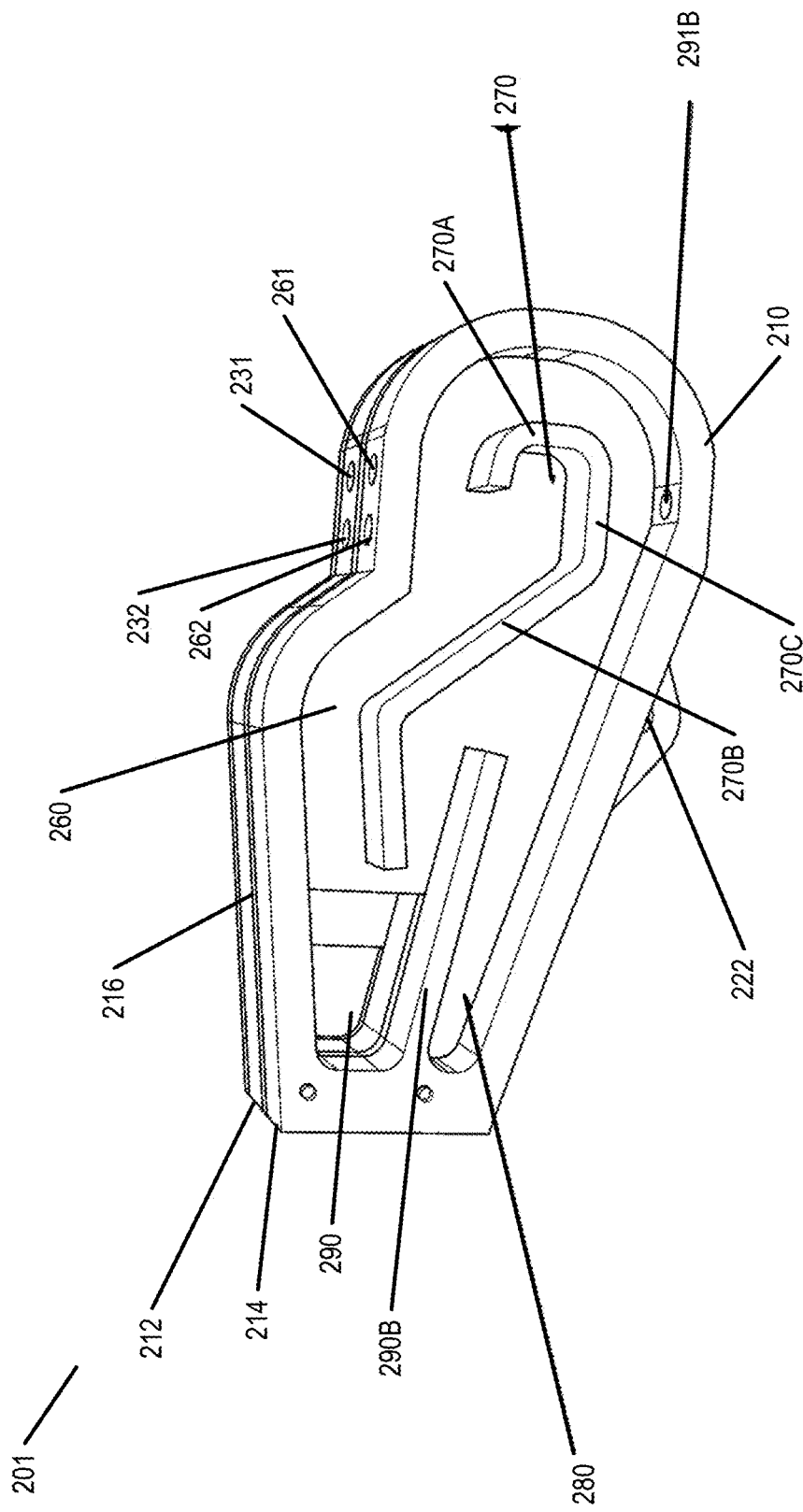

FIG. 9 is a perspective view illustrating an interior view of the second side of the chemical indicator apparatus in a first position, in accordance with some embodiments of the present disclosure.

Figure 10:
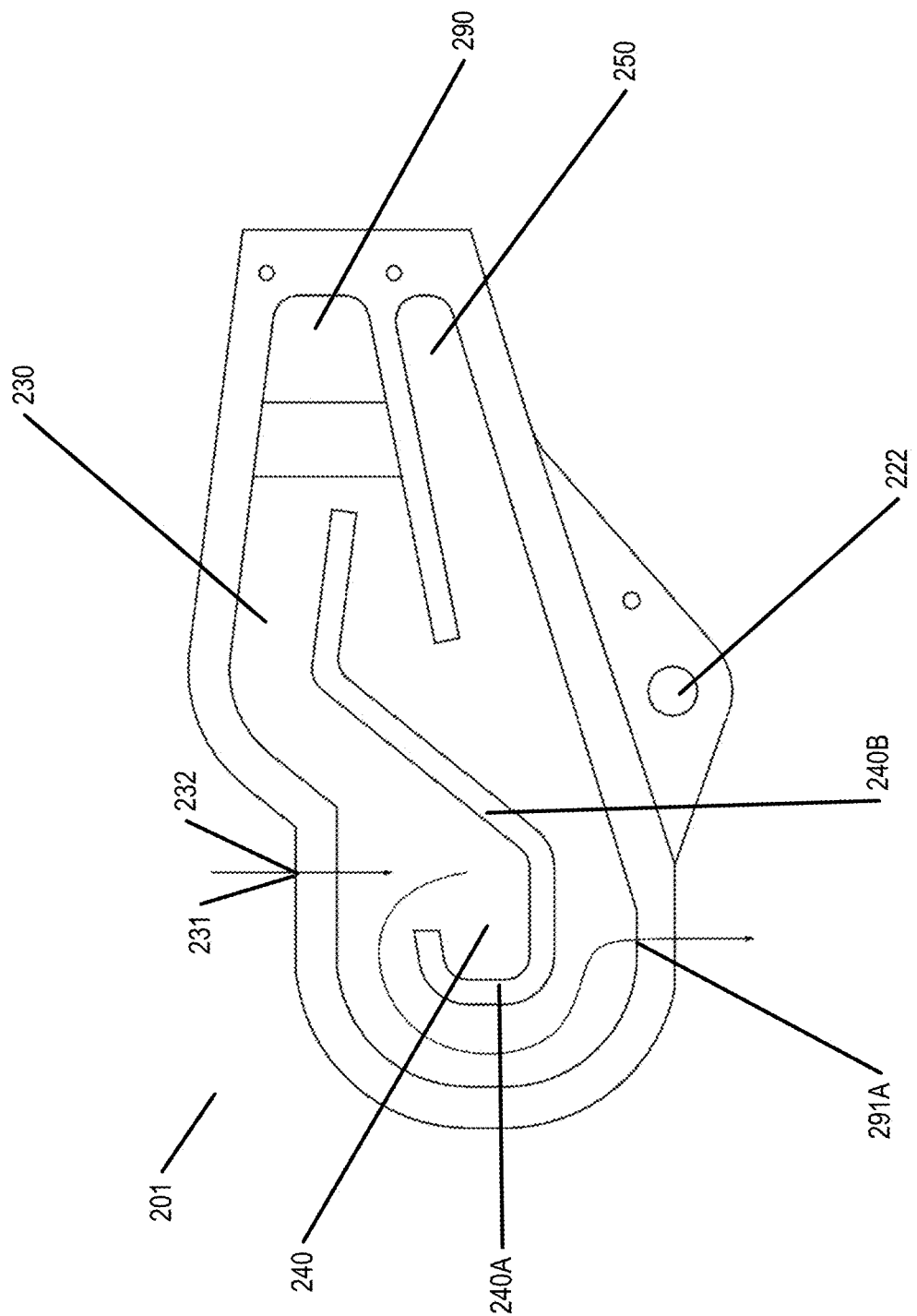

FIG. 10 is a first side view illustrating an internal view of the first side of the chemical indicator apparatus, in accordance with some embodiments of the present disclosure.

Figure 11:
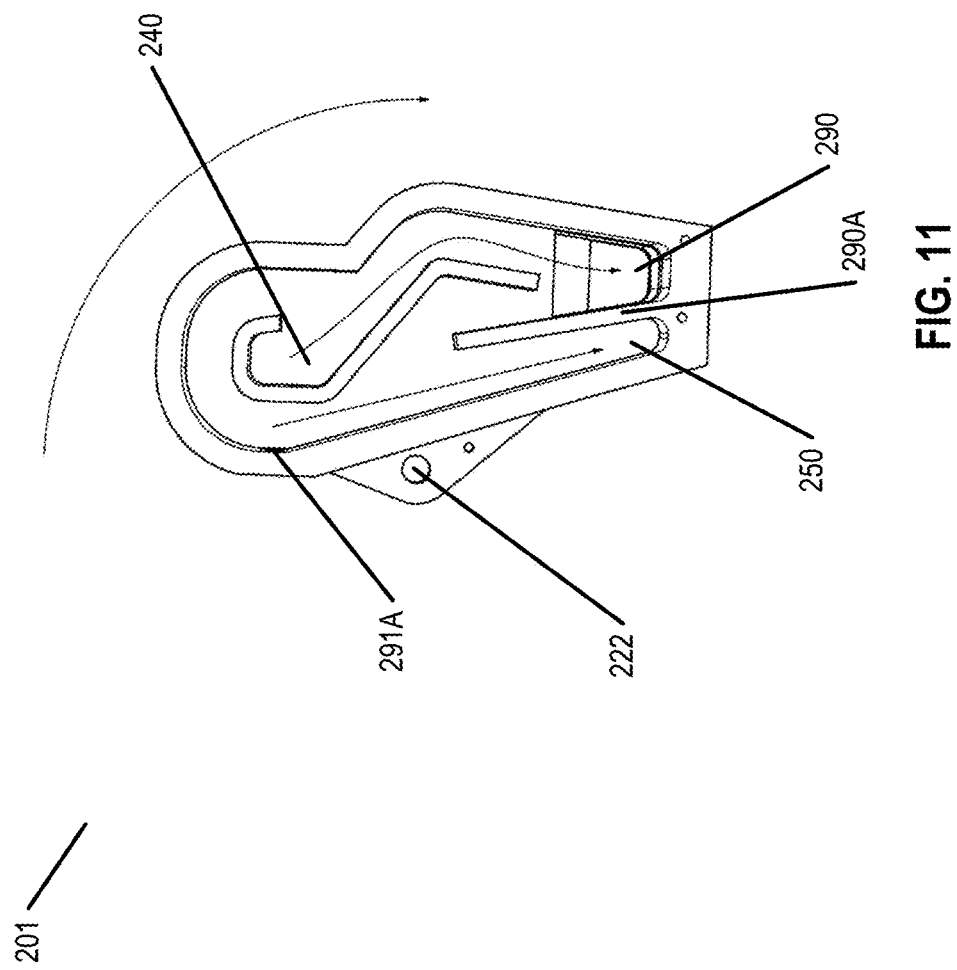

FIG. 11 is a perspective view illustrating the chemical indicator apparatus after being rotated to a second position, in accordance with some embodiments of the present disclosure.

Figure 12:
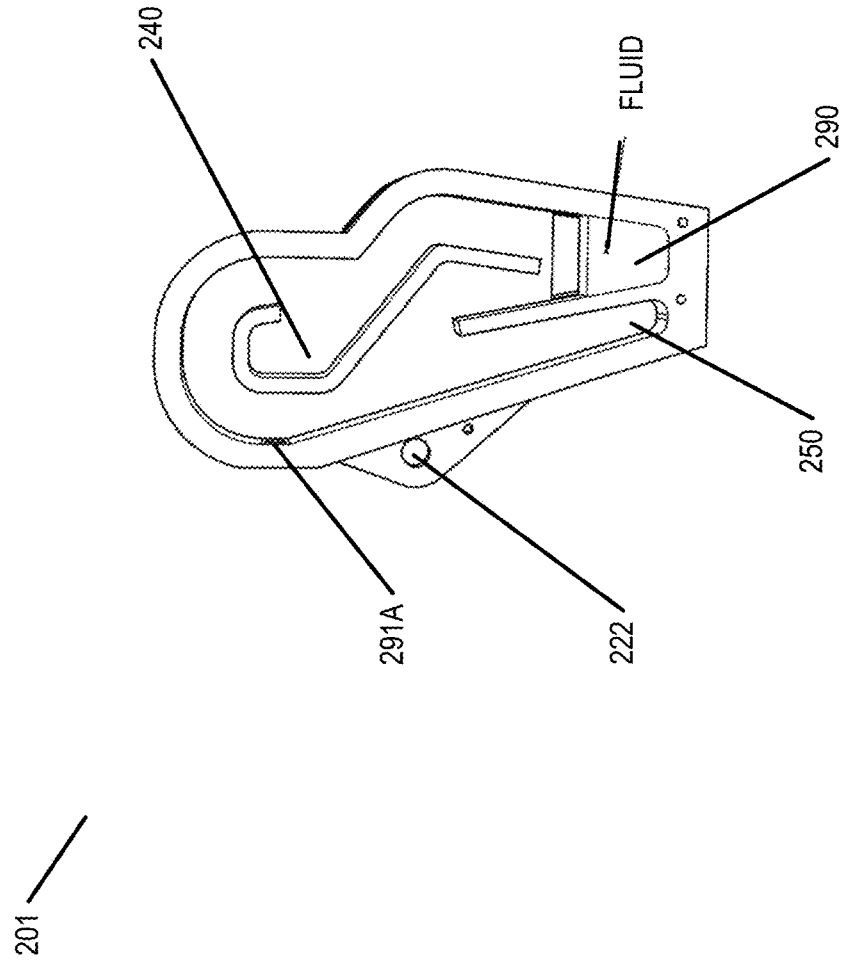

FIG. 12 is a perspective view illustrating the chemical indicator apparatus in the second position after the first fluid and the second fluid have entered the mixing cavity, in accordance with some embodiments of the present disclosure.

Figure 13:
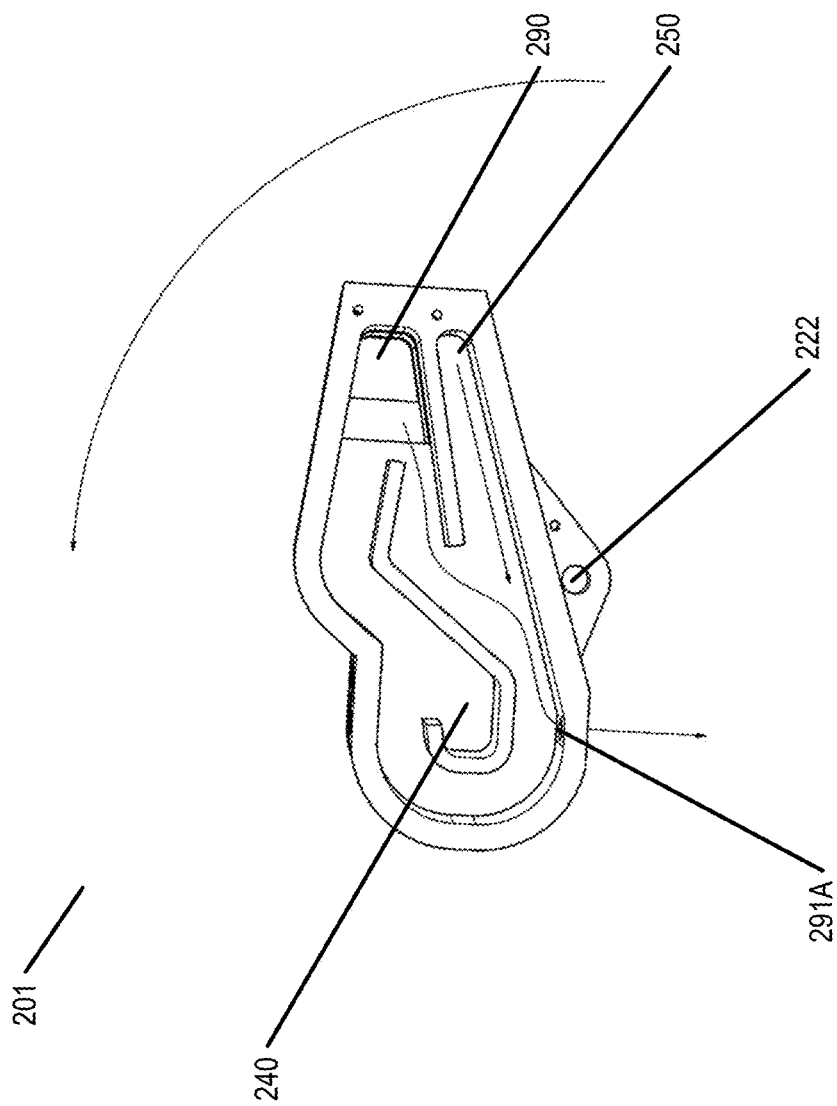

FIG. 13 is a perspective view illustrating the chemical indicator apparatus after being rotated into a third position (which may be the same as the first position) after the resulting solution has been analyzed, in accordance with some embodiments of the present disclosure.

Figure 14:
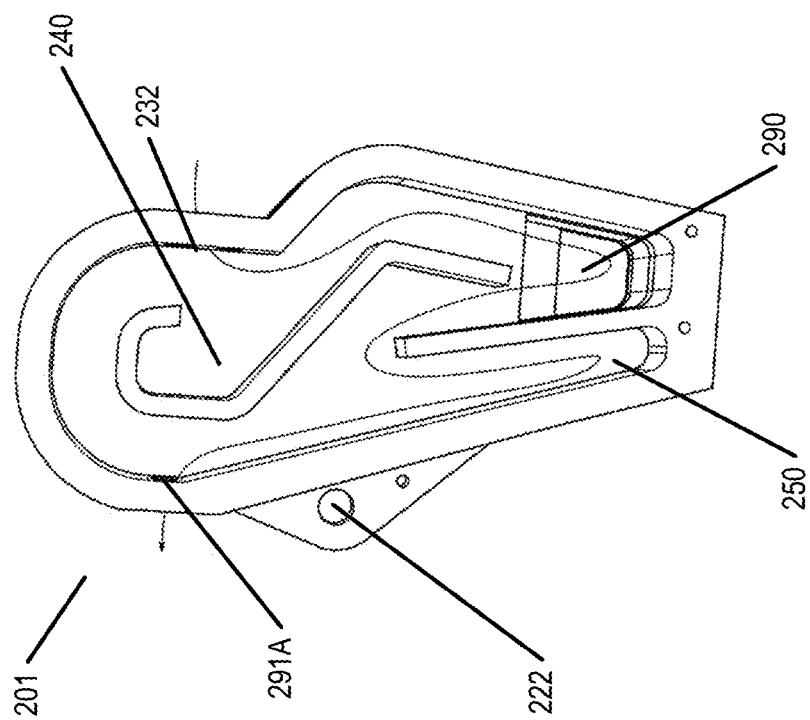

FIG. 14 is a perspective view illustrating a flow for rinsing the chemical indicator apparatus, in accordance with some embodiments of the present disclosure.

Figure 15:
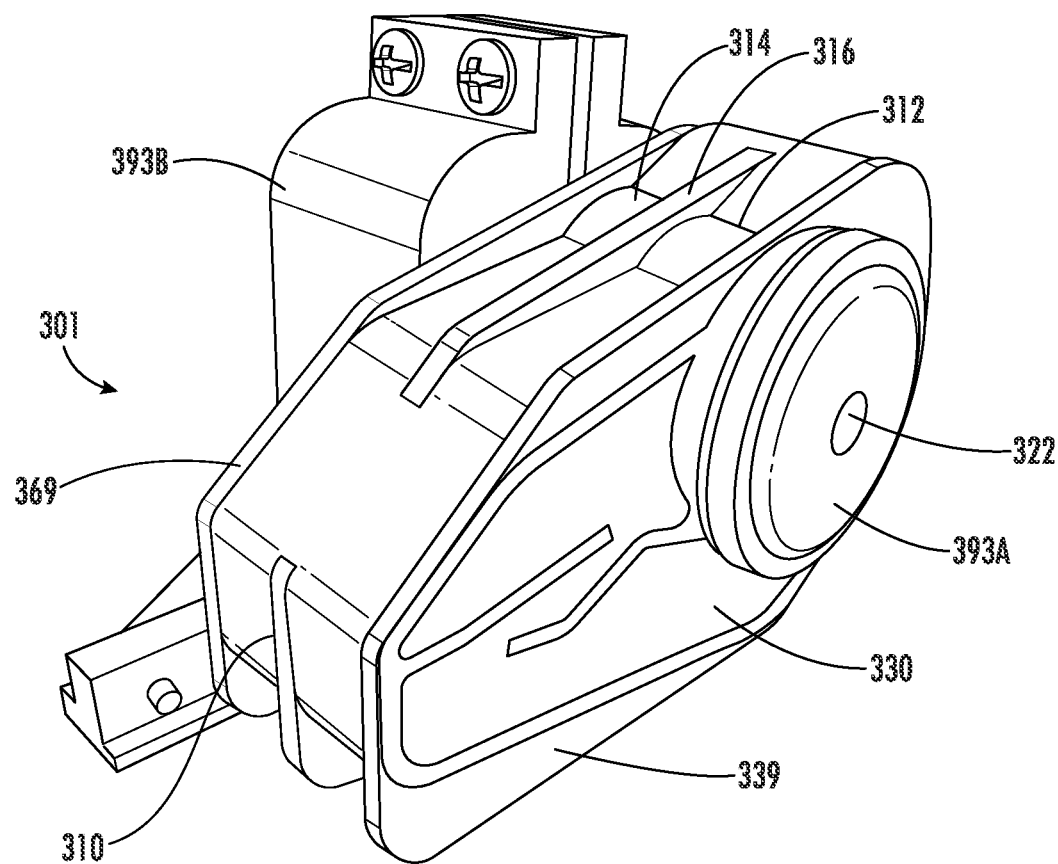

FIG. 15 is a perspective view illustrating an embodiment of the chemical indicator apparatus comprising a plug from a first side, in accordance with some embodiments of the present disclosure.

Figure 16:
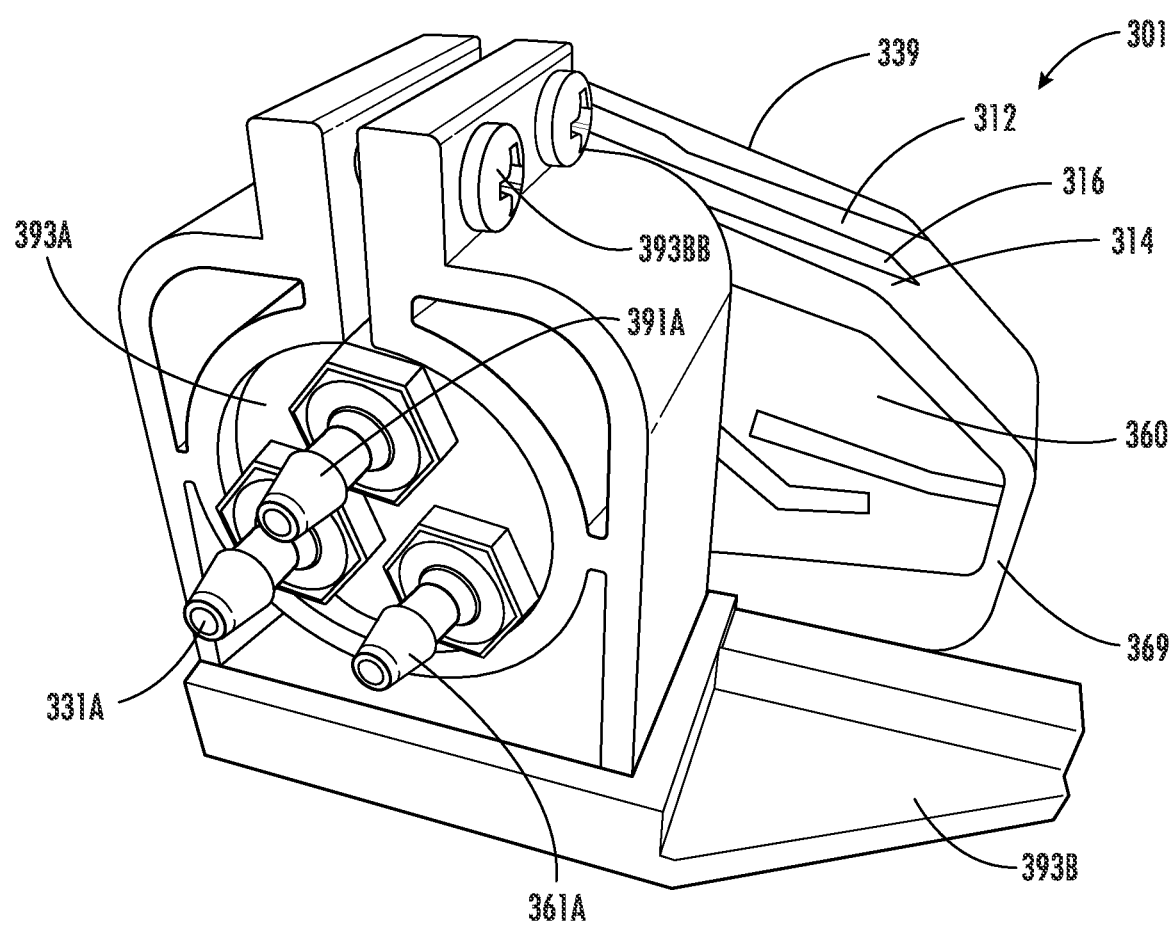

FIG. 16 is a perspective view illustrating the chemical indicator apparatus of FIG. 15 from a second side, in accordance with some embodiments of the present disclosure.

Figure 17:
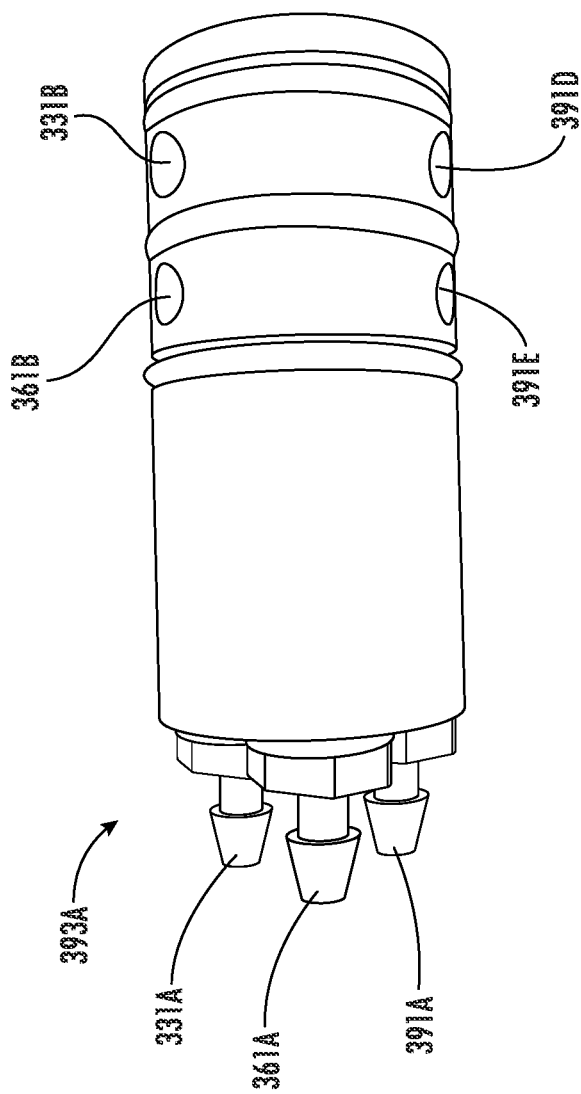

FIG. 17 is a perspective view illustrating the plug of the chemical indicator apparatus, in accordance with some embodiments of the present disclosure.

Figure 18:
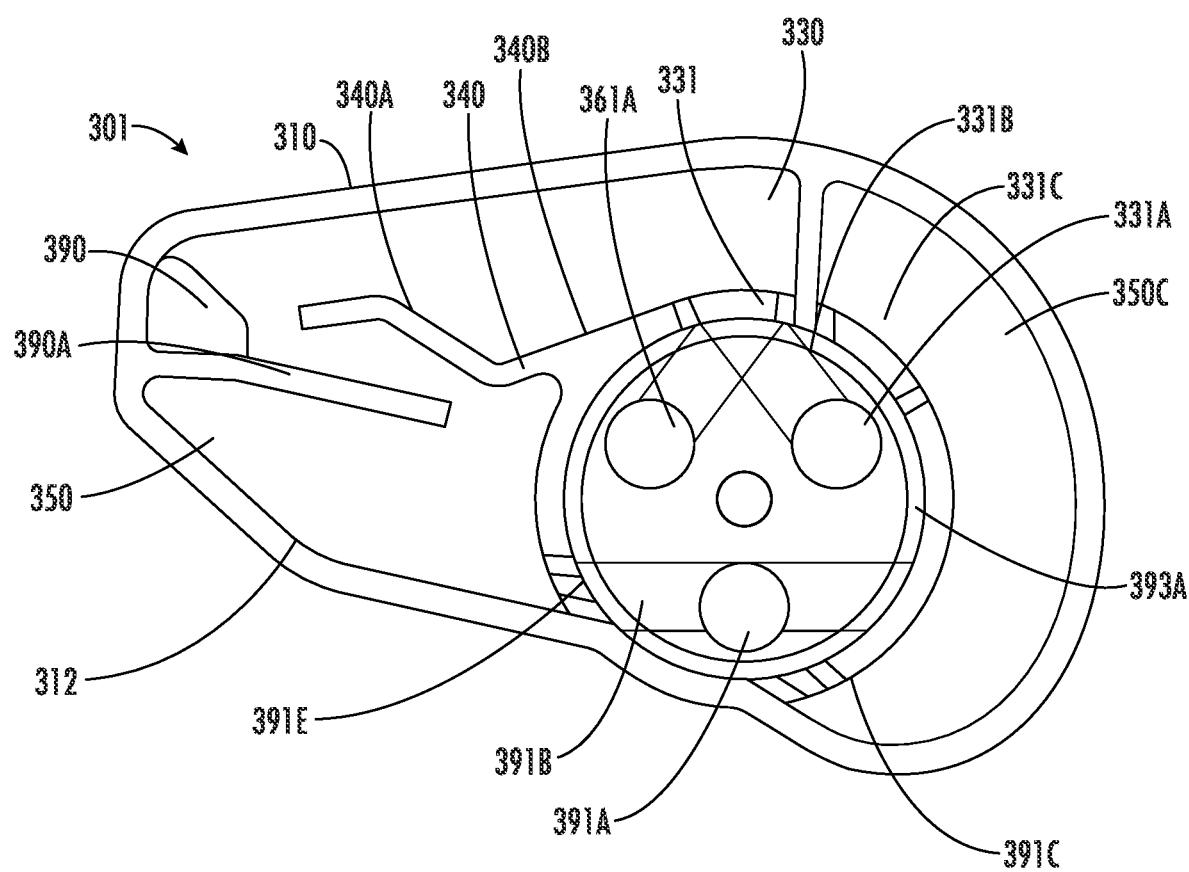

FIG. 18 is a perspective view illustrating an interior view of the chemical indicator apparatus from the first side in a first position, in accordance with some embodiments of the present disclosure.

Figure 19:
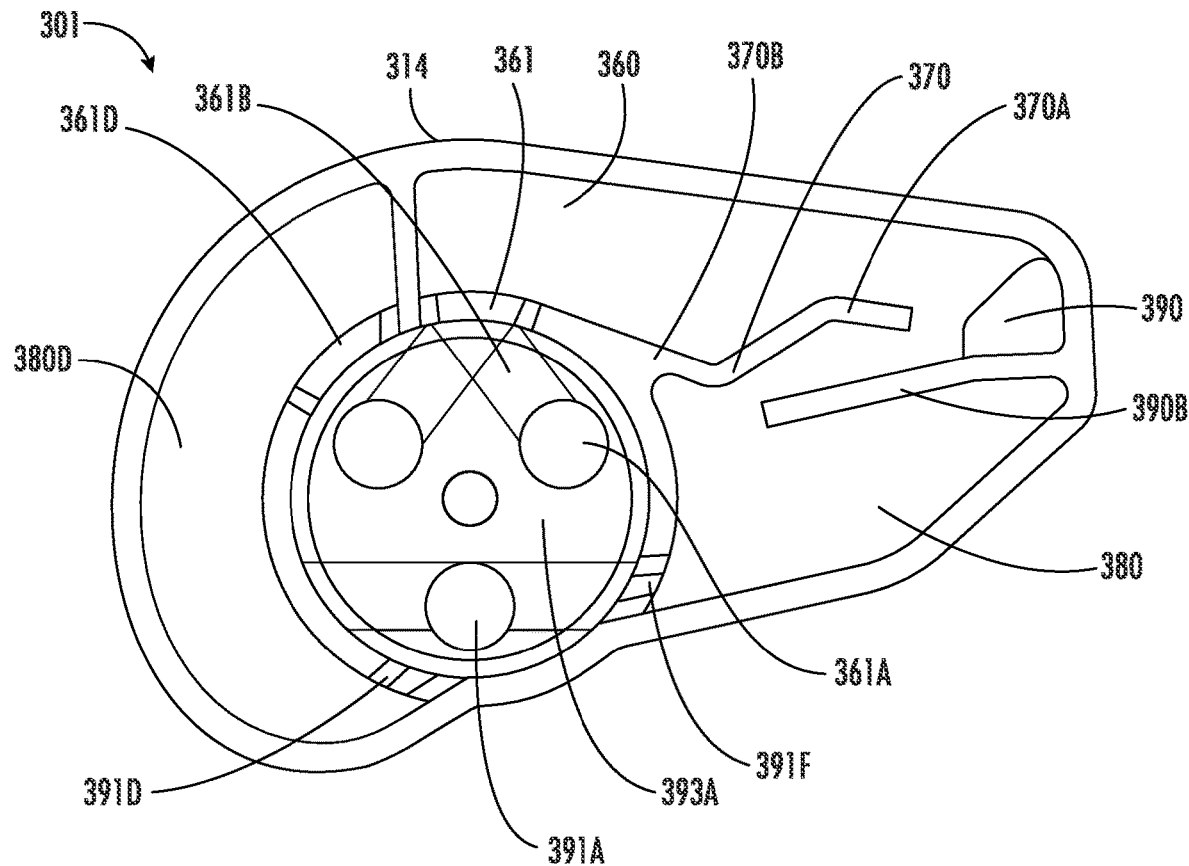

FIG. 19 is a perspective view illustrating an interior view of the chemical indicator apparatus from the second side in a first position, in accordance with some embodiments of the present disclosure.

Figure 20:
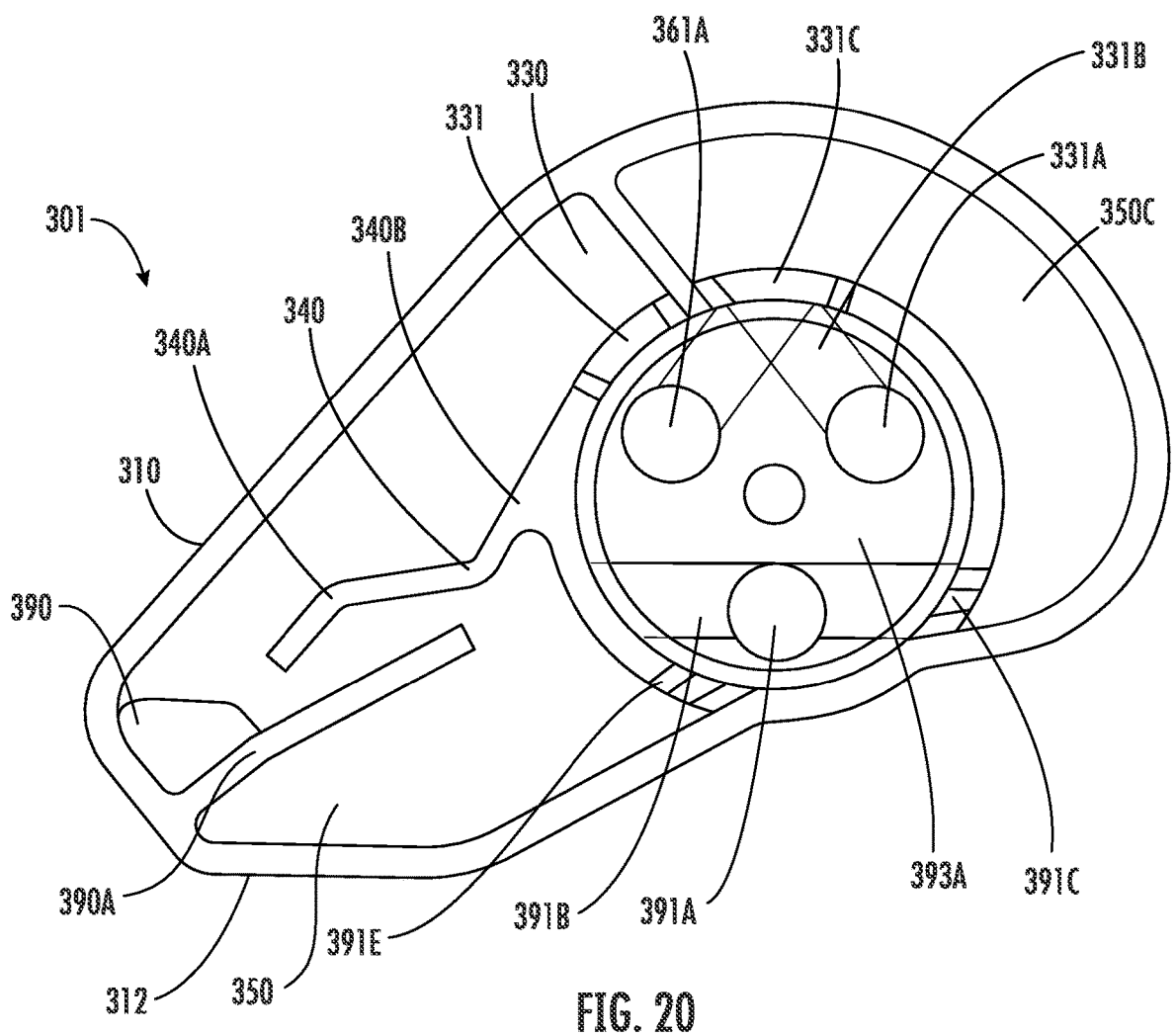

FIG. 20 is a perspective view illustrating an interior view of the chemical indicator apparatus from the first side in a second position, in accordance with some embodiments of the present disclosure.

Figure 21:
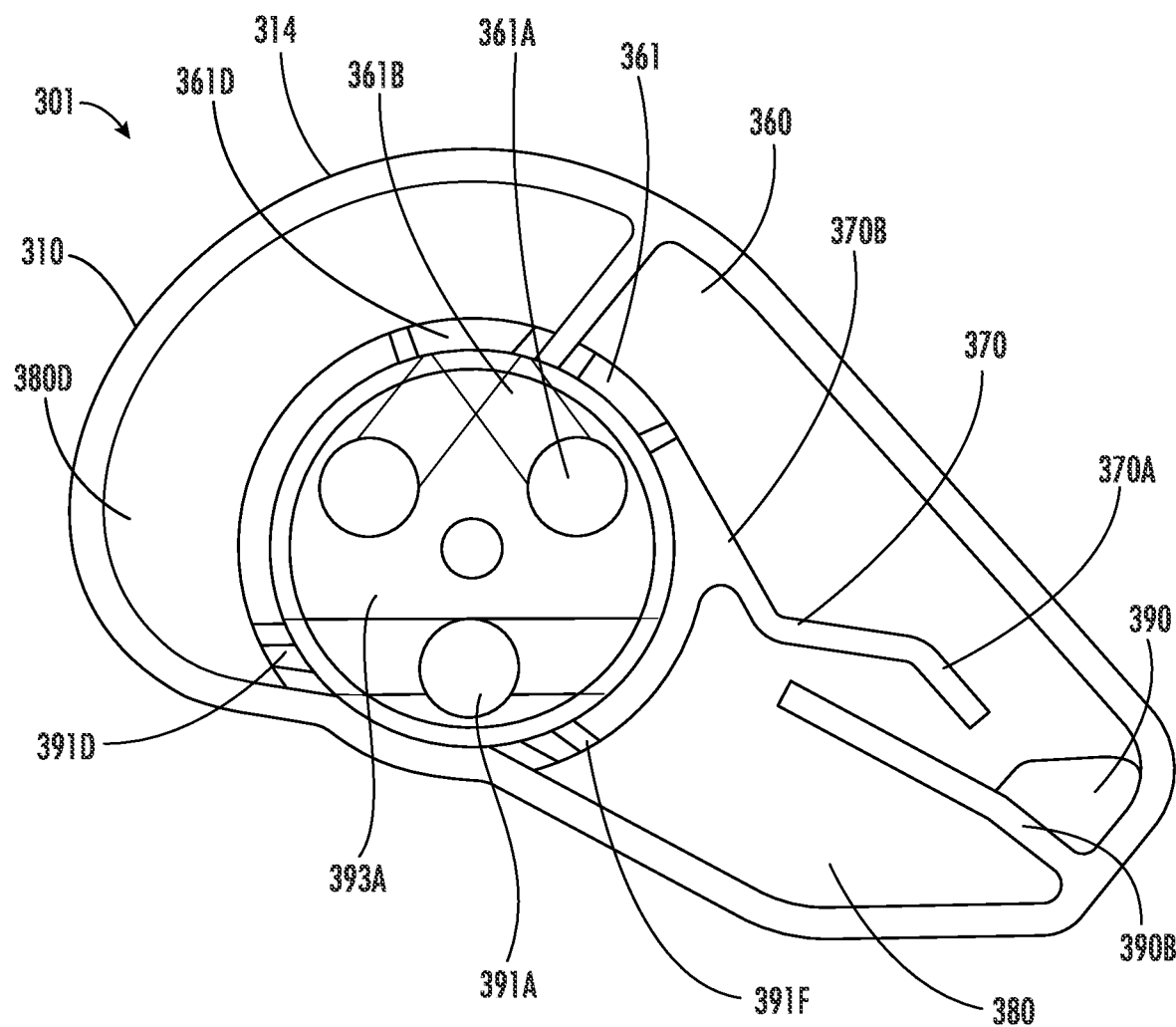

FIG. 21 is a perspective view illustrating an interior view of the chemical indicator apparatus from the second side in a second position, in accordance with some embodiments of the present disclosure.

Figure 22:
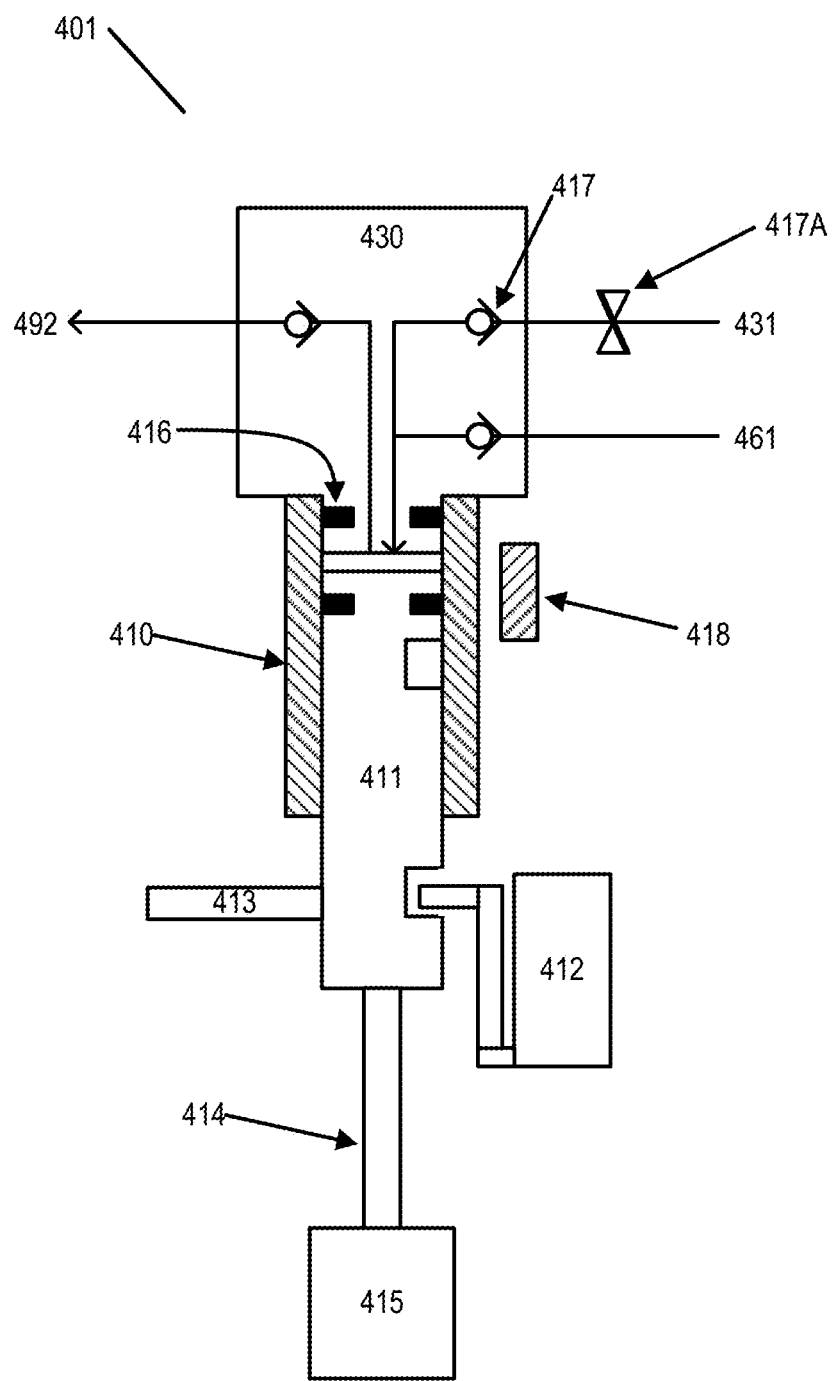
Figure 23:
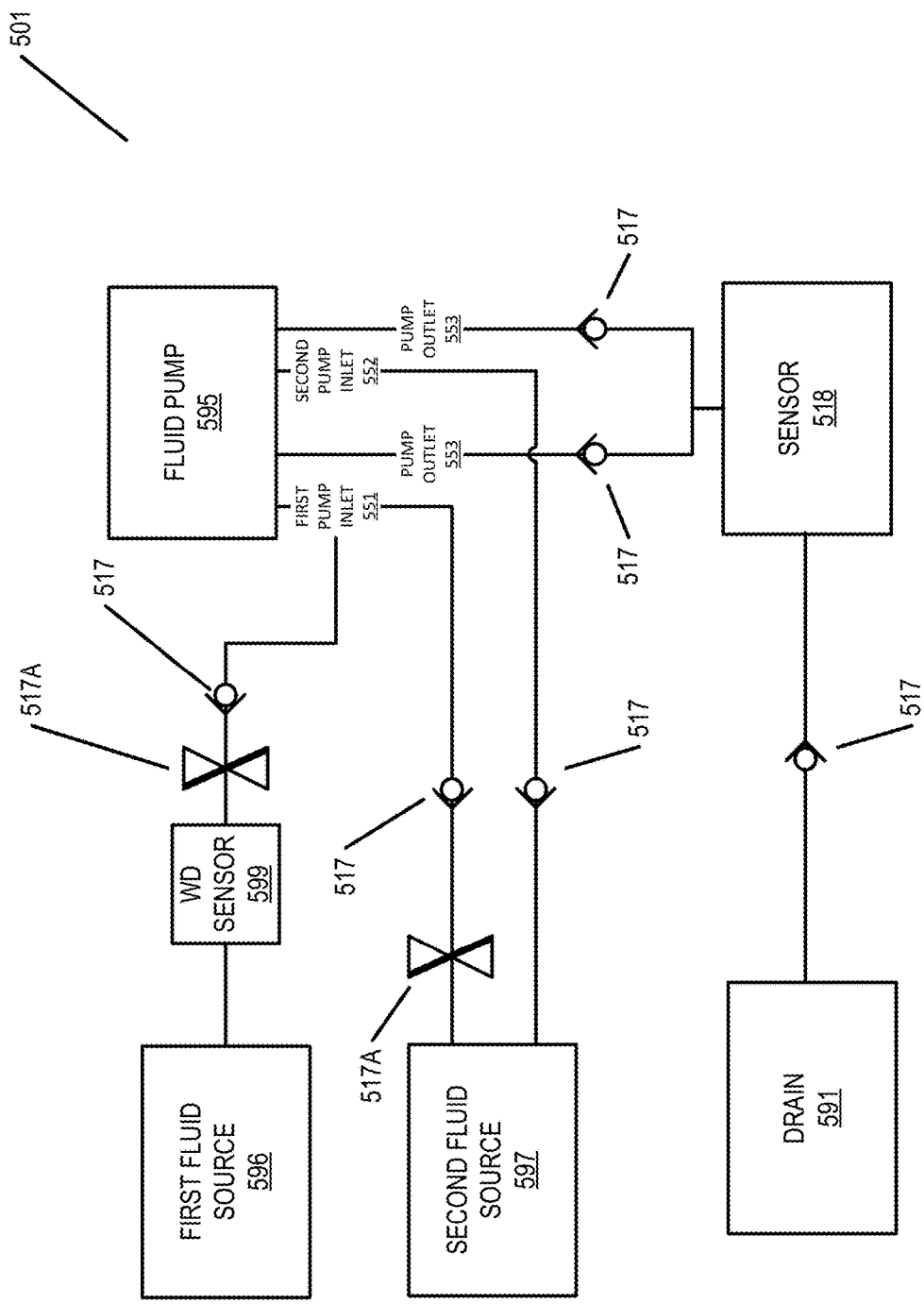

FIG. 22 is a perspective view illustrating an interior view of a chemical indicator detection apparatus, in accordance with some embodiments of the present disclosure;

FIG. 23 is a schematic diagram illustrating a chemical indicator detection system, in accordance with some embodiments of the present disclosure.

Figure 24:
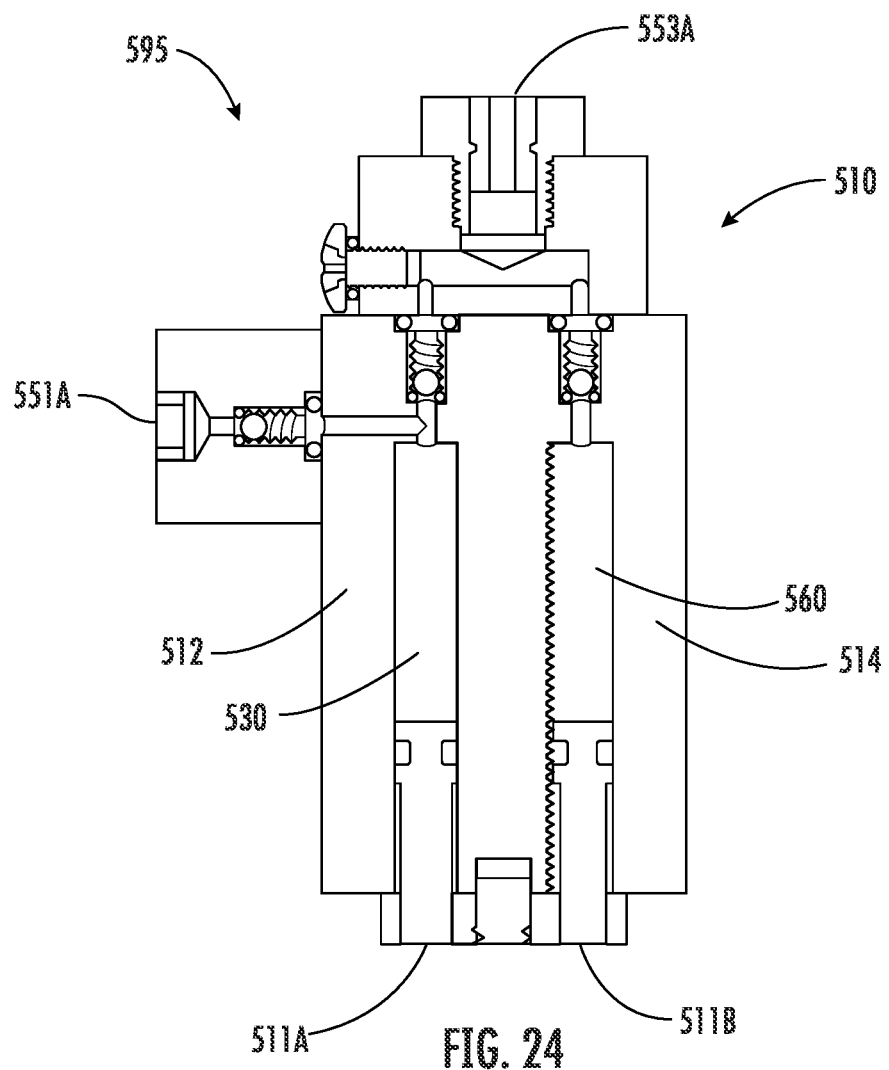

FIG. 24 is a perspective view illustrating a horizontal cross section of a chemical indicator pump of the chemical indicator apparatus, in accordance with some embodiments of the present disclosure.

Figure 25:
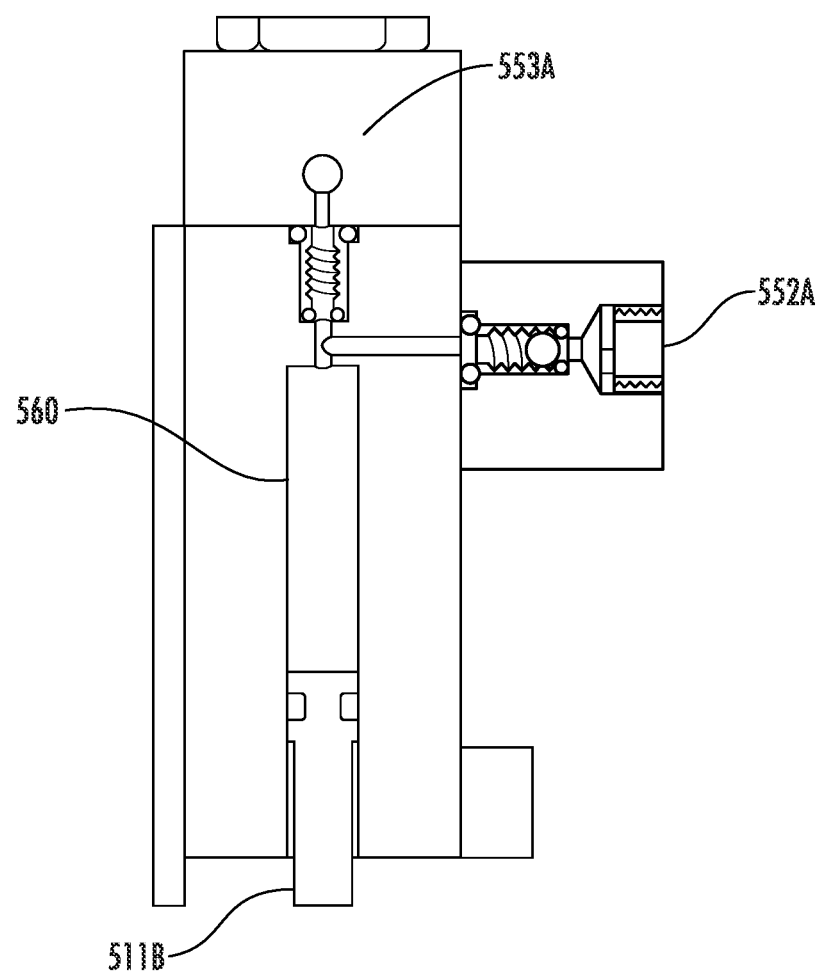

FIG. 25 is a perspective view illustrating a vertical cross section of the chemical indicator pump of the chemical indicator apparatus, in accordance with some embodiments of the present disclosure.

Figure 26:
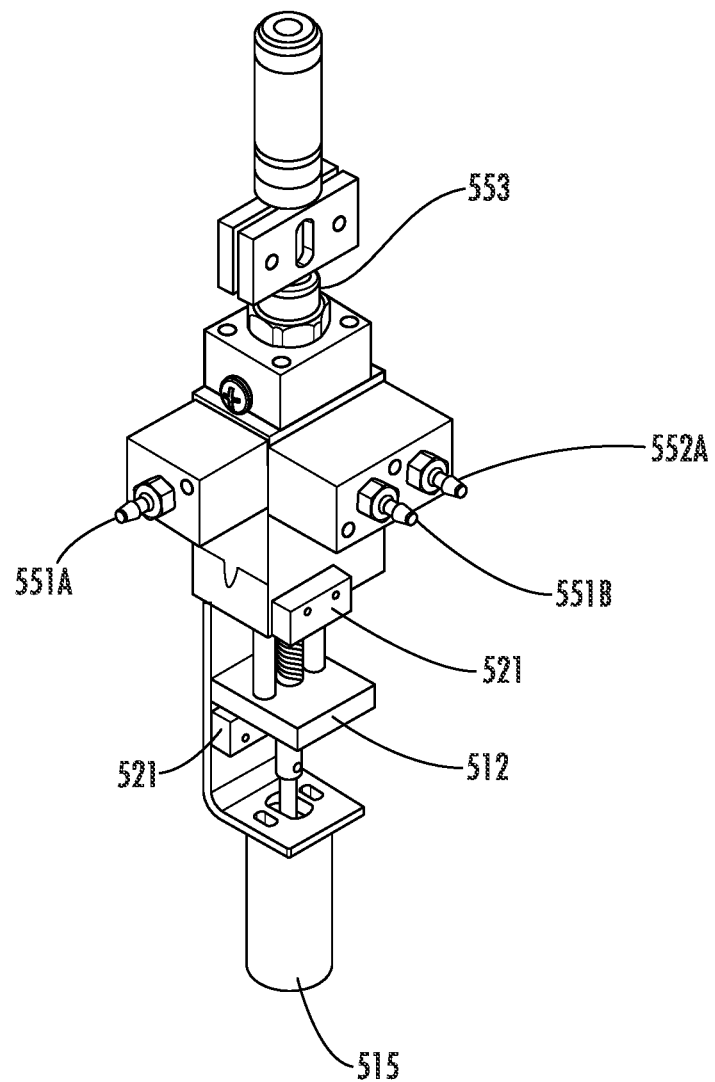

FIG. 26 is a perspective view illustrating a perspective isometric view of the chemical indicator apparatus, in accordance with some embodiments of the present disclosure.

Figure 27:
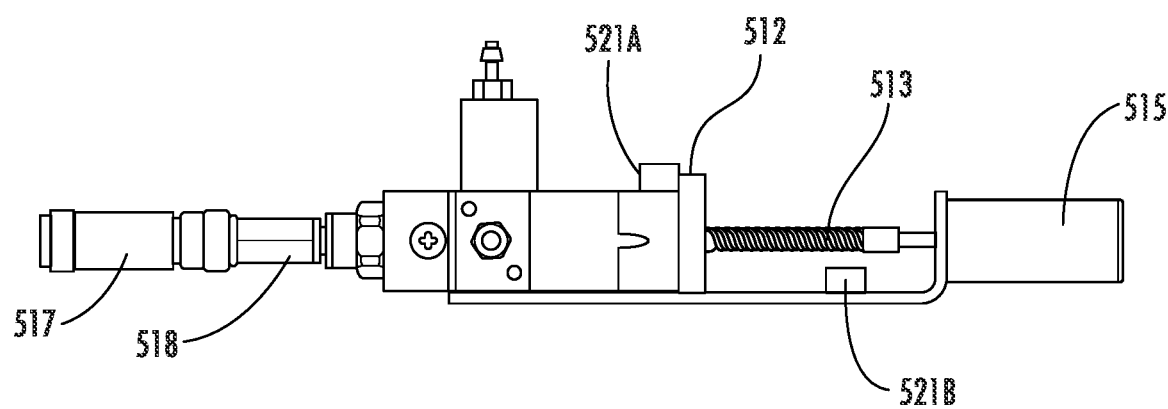

FIG. 27 is a perspective view illustrating a side view of the chemical indicator apparatus in a closed position, in accordance with some embodiments of the present disclosure.

Figure 28:
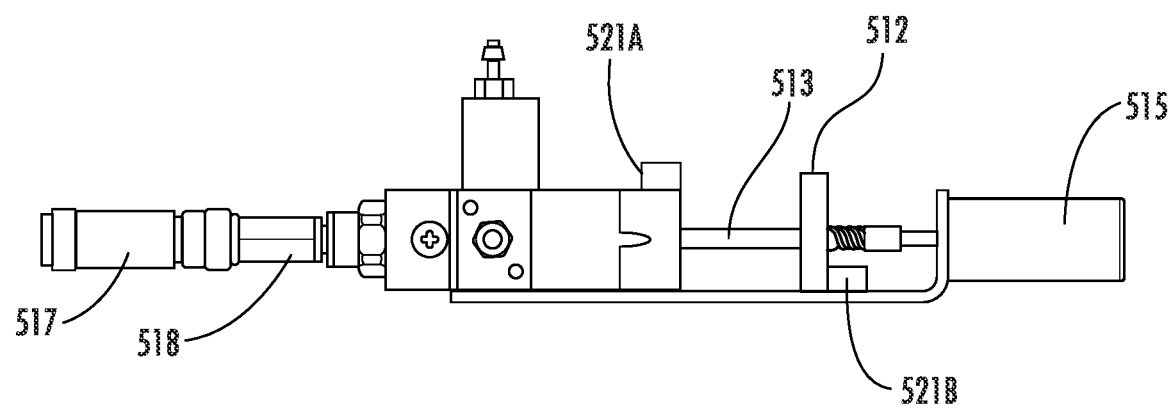

FIG. 28 is a perspective view illustrating a side view of the chemical indicator apparatus in an open position, in accordance with some embodiments of the present disclosure.

Figure 29:
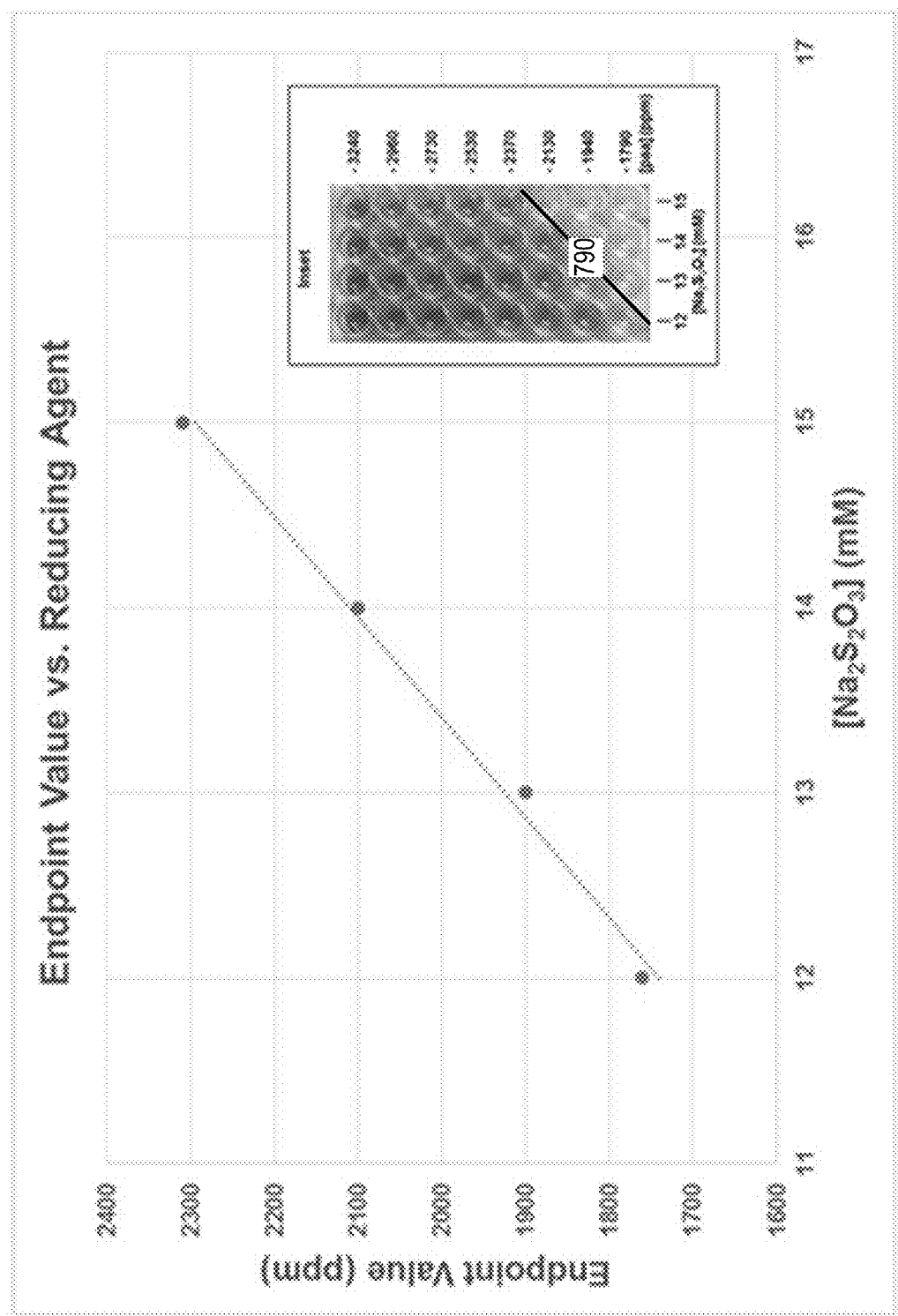

FIG. 29 is a line graph illustrating a linear relationship between concentrations of a reducing agent and endpoint values, in accordance with some embodiments of the present disclosure.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Chemical Indicator Apparatus

Referring now to the figures, FIG. 1 is a schematic diagram illustrating a chemical indicator detection system, in accordance with some embodiments of the present disclosure. In particular, the system may comprise a chemical indicator apparatus 1, which may comprise a housing 10. The housing 10 may in turn comprise a divider 16 which partitions the housing 10 into a first housing portion 12 and a second housing portion 14. The first housing portion 12 may comprise one or more intake ports, such as a first detection fluid intake port 31 and a first rinsing fluid intake port 32, where each of the one or more intake ports fluidly connect the exterior of the first housing portion 12 with a first fluid chamber located within the first housing portion 12. The first detection fluid intake port 31 may be fluidly connected with a first fluid source 96, which may supply a first fluid to the first fluid chamber through the first detection fluid intake port 31. Similarly, the rinsing fluid intake port 32 of the first housing portion 12 may be fluidly connected with a rinsing fluid source 98 which may supply rinsing fluid to the first fluid chamber through the rinsing fluid intake port 32. It should be understood that although the first detection fluid intake port 31 and the rinsing fluid intake port 32 are depicted herein as separate ports, it is within the scope of the disclosure for the functions of both the first detection fluid intake port 31 and the rinsing fluid intake port 32 to be performed by a single fluid intake port. In some embodiments, "detection fluid" as used herein may refer to the solution for which an analyte concentration is to be measured (e.g., a solution containing a disinfectant or a chemical indicator for the disinfectant), while "rinsing fluid" as used herein may refer to a solution which is used to rinse the internals of the apparatus (e.g., distilled water, rinse solution, or the like).

As described above, the first fluid source 96 may contain a first fluid to be supplied to the chemical indicator apparatus 1. In some embodiments, the first fluid may be a chemical indicator, which may be a chemical compound that, when placed into a solution, provides a physically detectable indication of the characteristics of the solution. For instance, the chemical indicator may be a pH-based indicator which changes color based on the hydrogen ion content of the solution (e.g., methyl red, bromophenol blue, or the like). In other embodiments, the chemical indicator may be a compound or combination of compounds that change color based on the concentration of peracetic acid ("PAA") in the solution (e.g., starch-iodide, ferroin, ferrous thiocyanate, ceric sulphate, n,n diethyl-p-phenylene diamine ("DPD"), potassium iodide, or the like). In such embodiments, the chemical indicator may provide a colorimetric method to determine the concentration of PAA in a given solution. The resulting color of the solution may be measured via a color sensor or detector, such as a color sensing printed circuit board, or by qualitative analysis, as will be described in further detail herein.

The system may further comprise one or more pumps 95 that may serve to pump solutions and/or fluids into the apparatus 1. In a preferred embodiment, the pumps may be low cost diaphragm pumps. That said, it is within the scope of the present disclosure for other types of pumps to be used (e.g., a primed centrifugal pump). Moreover, in other embodiments the fluids described herein may be supplied and/or transferred through other ways, such as through gravity.

The second housing portion 14 may comprise one or more second fluid intake ports, such as a second detection fluid intake port 61 and a second rinsing fluid intake port 62, where each of said intake ports fluidly connect the exterior of the second housing portion 14 with a second fluid chamber located within the second housing portion 14. The second detection fluid intake port 61 may be fluidly connected with a second fluid source 97, which may supply a second fluid to the second fluid chamber through the second detection fluid intake port 61. Similarly, the second rinsing fluid intake port 62 of the second housing portion 14 may be fluidly connected with the rinsing fluid source 98 which may supply rinsing fluid to the second fluid chamber through the rinsing fluid intake port 62. It should be understood that although the second detection fluid intake port 61 and the second rinsing fluid intake port 62 are depicted herein as separate ports, it is within the scope of the disclosure for the functions of both the second detection fluid intake port 61 and the second rinsing fluid intake port 62, along with any other fluid intake port described herein, to be performed by a single fluid intake port. Moreover, in some embodiments of the invention, it should be understood that the first rinsing fluid intake port 32 and the second rinsing fluid intake port 62 may be a single rinsing fluid intake port, which in some embodiments may include a mechanism for delivering the rinsing fluid to with the first housing portion 12 and/or the second housing portion 14 as needed to flush out the apparatus 1, as will be described in further detail herein. Furthermore, in other embodiments of the invention, there may be any number of one or more intake ports that are used to supply the disinfectant solution, the chemical indicator, and/or the rinsing fluid into the chemical indicator apparatus 1, which can be directed to the desired chambers, as will be described herein.

The first housing portion 12 may further comprise a first drain port 33 which may allow fluid to drain from the first fluid chamber. Similarly, the second housing portion 14 may comprise a second drain port 63 which may allow fluid to drain from the second fluid chamber. In some embodiments, said drain ports 33, 63 may be dimensioned to allow fluid to drain from their respective fluid chambers by gravity alone. In other embodiments, the drain ports 33, 63 may be coupled to other components in order to facilitate drainage, such as to tubes or pipes which use pressure differentials (e.g., a vacuum) to drain the respective fluid chambers. Moreover, it should be understood that in some embodiments of the invention, there may be one or more drain ports in the housing 10, such that a single or multiple drain ports may be used to drain fluids from one or more chambers within the housing 10.

The system may further comprise a mechanical actuator 20 operatively connected to the chemical indicator apparatus 1 via an actuation member 21. In some embodiments, the mechanical actuator 20 may comprise one or more motors, cranks, levers, pulleys, and/or mechanical linkages which may cause the actuation member 21 to rotate, thereby changing the orientation of the housing 10 to one of multiple possible positions. In this regard, the mechanical actuator 20 may be driven by various different sources of energy, such as electricity, elastic potential energy, chemical potential energy, or the like. In other embodiments, the housing 10 may be manually rotated by a user.

FIG. 2 shows an interior of a first side of a chemical indicator apparatus 101, in accordance with some embodiments. The chemical indicator apparatus 101 may comprise a housing 110 separated into a first housing portion 112 and a second housing portion 114 by a divider 116. The first housing portion 112 may comprise a first fluid chamber 130 therein which may accept a first fluid from a first detection fluid intake port 131. Though the first fluid chamber 130 is depicted as exposed in FIG. 2, a first end member 139 (e.g., a first end cover, or the like) may be connected to the first housing portion 112 when the apparatus 101 is in operation. The first end member 139 may further comprise a viewport 191 which may allow a user or device to view the interior of the first fluid chamber 130. In some embodiments, the viewport 191 may comprise a clear barrier (e.g., glass or polymer) which may prevent fluids from exiting the first fluid chamber 130 via the viewport 191.

In some embodiments, the first fluid may be a chemical indicator solution for detecting PAA concentration, or other chemical indicator as described herein. In this regard, the first fluid chamber 130 may comprise a first fluid guide member 141 which, when the housing 110 is oriented in a first position, is located adjacent (e.g., underneath, or the like) the first detection fluid intake port 131. The first fluid guide member 141 may extend laterally (e.g., at a negative angle—as illustrated, parallel, upwardly, or the like) such that the first fluid at some point flows along (e.g., down, over, or the like) the first fluid guide member 141. Furthermore, the end of the first fluid guide member 141 may be located adjacent (e.g., centered above, directed into, or the like) a first measuring cavity 140 within the first fluid chamber 130 such that the first fluid flows past (e.g., off, over, or the like) the first fluid guide member 141 into the first measuring cavity 140.

The first measuring cavity 140 may comprise a surface defined in order to hold a particular amount of the chemical indicator, which may be formed by a first sidewall 140A and a second sidewall 140B connected by a floor 140C (or "bottom wall"). In some embodiments, said surface may be substantially rounded and/or curved and/or may be continuous. The first sidewall 140A may be shorter in length than the second sidewall 140B, and/or the first measuring cavity 140 may be structured, such that as the first measuring cavity 140 reaches maximum fluid capacity, extra fluid flowing from the first fluid guide member 141 may overflow over the first measuring cavity 140, such as overflow the first sidewall 140A into a first residue cavity 150 within the first fluid chamber 130. It should be understood that in some embodiments, the first residue cavity 150 may allow the overflow fluid to flow out of the first fluid chamber 130 via a drain port 192 located in the first residue cavity 150. In this way, because the maximum capacity of the first measuring cavity 140 is known, so long as the volume of the first fluid entering the first fluid chamber 130 meets or exceeds the maximum capacity of the first measuring cavity 140, the chemical indicator apparatus 101 may ensure that a known quantity of first fluid is measured without the use of precision pumps.

The second housing portion 114 and the second fluid chamber therein may substantially be a mirror image of the first housing portion 112 and the first fluid chamber 130. Accordingly, reference may be made herein to counterparts of components within the first housing portion 112 which may be found in the second housing portion 114. For example, the second fluid chamber may accept fluids from a second fluid intake port, which substantially mirrors the first fluid intake port, and so on.

Accordingly, FIG. 3 shows a second end member 169 which may be coupled to the second housing portion 114, in accordance with some embodiments. The second end member 169 may further comprise a viewport 191A which may allow a user or device to view the interior of the second fluid chamber 160. In some embodiments, the viewport 191A may comprise a clear barrier (e.g., glass or polymer) which may prevent fluids from exiting the second fluid chamber 160 via the viewport 191A. The second end member 169 may further comprise a first fluid intake aperture 131A which may allow a connecting member (e.g., a tube, pipe, or the like) to deliver the first fluid to the first fluid chamber 130. The second end member 169 may also comprise a second fluid intake aperture 161A which may allow a connecting member to deliver the second fluid to the second fluid chamber. Finally, the second end member 169 may comprise a drain port aperture 192A that allows fluid to be drained from the first fluid chamber 130 and/or the second fluid chamber. In some embodiments, fluid may be drained via the drain port aperture 192A by gravity alone. In other embodiments, a vacuum may be used to allow negative pressure to remove fluids via the drain port aperture 192A.

In some embodiments, the second fluid may be a disinfectant solution containing PAA, or other disinfectant. The second fluid chamber may comprise a second fluid guide member which, when the housing is oriented in the first position, is located adjacent (e.g., underneath, or the like) the second detection fluid intake port. The second fluid guide member may extend laterally (e.g., at a negative angle—as illustrated, parallel, upwardly, or the like) such that the second fluid at some point flows along (e.g., down, over, or the like) the second fluid guide member. Furthermore, the end of the second fluid guide member may be located adjacent (e.g., centered above, directed into, or the like) a second measuring cavity within the second fluid chamber such that the first fluid flows past (e.g., off, over, or the like) the second fluid guide member into a second measuring cavity within the second fluid chamber.

Similar to the first measuring cavity 140, the second measuring cavity may comprise a surface defined in order to hold a particular amount of the disinfectant solution, which may be any shape (e.g., substantially rounded and/or curved surface and/or continuous) defined by a first sidewall and a second sidewall connected by a floor (or "bottom wall"). In some embodiments the sidewalls and/or floor may be continuous. The first sidewall may be shorter in length than the second sidewall, or the second measuring cavity may be structured, such that as the second measuring cavity reaches maximum fluid capacity, extra fluid flowing from the second guide member may overflow over the second measuring cavity, such as overflow the first sidewall into a second residue cavity within the second fluid chamber. It should be understood that in some embodiments, the second residue cavity may allow the overflow fluid to flow out of the second fluid chamber via a drain port located within the second residue cavity.

The first fluid may flow into the first fluid chamber 130 via the first detection fluid intake port 131 contemporaneously (or at different times depending on the need) with a second fluid flowing into the second fluid chamber via the second detection fluid intake port when the housing 110 is oriented in the first position, such that both the first measuring cavity 140 and the second measuring cavity respectively contain known quantities of the first fluid and the second fluid (e.g., the chemical indicator, the disinfectant solution, or the like).

Referring again to FIG. 2, the first measuring cavity 140 may further comprise a lateral extension which extends into a mixing cavity 190 (e.g., a portion of the second sidewall 140B of the first measuring cavity 140 may extent into a mixing cavity 190, or the like). The mixing cavity 190 may be defined by one or more walls, such as for example by a first sidewall 190A and a second sidewall 190B, or the like. For example, one or more of the walls of the mixing cavity 190 (e.g., the first sidewall 190A and second sidewall 190B of the mixing cavity 190) may extend in length past a portion of the first measuring cavity 140 (e.g., the tip of the lateral extension of a second sidewall 140B of the first measuring cavity 140). In this way, with the first measuring cavity 140 filled to capacity with the first fluid, the housing 110 may be rotated (e.g., along a longitudinal axis, assuming that one of the "sides" of the first housing portion 112 is the "front" of the apparatus 101) to a second position of the housing 110. It should be understood that in some embodiments the second position is a different rotational position from the first position, such as oriented perpendicular to the first position (e.g., about 90 degrees+/−10 degrees, or the like), substantially perpendicular to the first position (e.g., 70 to 120 degrees), generally perpendicular to the first position (e.g., 45 degrees to 135 degrees). Regardless of the position of the second position with respect to the first position, in the second position, the mixing cavity 190 may be located at least partially below the first measuring cavity 140 such that the first fluid may flow out of the first measuring cavity 140 (e.g., down the lateral extension from the second sidewall 140B of the first measuring cavity 140) into the mixing cavity 190 (e.g., such as between the first sidewall 190A and second sidewall 190B of the mixing cavity 190, or the like).

Likewise, the second measuring cavity may further comprise a lateral extension which extends into the mixing cavity 190 (e.g., a portion of the second sidewall of the second measuring cavity may extend into a mixing cavity 190, or the like). The mixing cavity 190 may be defined by one or more walls, such as for example by a first sidewall and a second sidewall, or the like. For example, one or more of the walls of the mixing cavity 190 (e.g., the first sidewall and the second sidewall of the mixing cavity) may extend in length past a portion of the second measuring cavity (e.g., the tip of the lateral extension of the second sidewall of the first measuring cavity). In this way, with the second measuring cavity filled to capacity with the second fluid, the housing 110 may be rotated (e.g., along a longitudinal axis) to a second position of the housing 110 (e.g., perpendicular, substantially perpendicular, generally perpendicular, or the like). As previously discussed, regardless of the position of the second position with respect to the first position, in the second position, the mixing cavity 190 may be located at least partially below the second measuring cavity such that the second fluid may flow out of the second measuring cavity (e.g., down the lateral extension of the second sidewall of the second measuring cavity) into the mixing cavity 190 (e.g., such as between the first sidewall and second sidewall of the mixing cavity 190, or the like).

Once both the first fluid and the second fluid have entered the mixing cavity 190, the first fluid may mix with the second fluid to form a single solution. To this end, the housing 110, when oriented in the second position, may be oscillated (e.g., between +/−5, 10, 15, 20, 25, 30 degrees, or the like from a second position—such as a vertical axis, or the like) multiple times (e.g., two or more times, or the like) to allow the first fluid to thoroughly mix with the second fluid. In some embodiments, in which the first fluid is a chemical indicator for detecting PAA and the second fluid is a PAA disinfectant solution, the resulting solution within the mixing cavity 190 may change colors depending on the concentration of PAA in the resulting solution. For example, if the concentration of PAA exceeds a specified threshold (e.g., based on the concentration of the chemical indicator), the chemical indicator may cause the resulting solution to change color (e.g., from clear to green, or other like color change or shade thereof). On the other hand, if the concentration of PAA in the resulting solution does not meet or exceed the specified threshold, the color of the resulting solution may remain the same (e.g., clear, or turn a different color or shade thereof). The color of the resulting solution may be detected qualitatively through the viewport 191 of the first end member 139 or the viewport 191A of the second end member 169. In other embodiments, a color sensor printed circuit board ("PCB") may be used to quantitatively assess the color of the solution. In such embodiments, the PCB may be placed in or adjacent to the viewport 191, 191A to allow the PCB to detect the color of the resulting solution.

After the color measurements have been conducted on the resulting solution, the housing 110 may be rotated back into the first position or another position (e.g., a third position). In some embodiments, the mixing cavity 190 may be structured (e.g., the second sidewall 190B of the mixing cavity 190 may be negatively angled and extend downward, or the like) such that the resulting solution flows out of the mixing cavity 190 (e.g., across the second sidewall 190B—such as the portion located in the first fluid chamber 130, or the like) into the first residue cavity 150. Similarly, a portion of the resulting solution may flow out of the mixing cavity 190 (e.g., across the second sidewall—such as the portion located in the second fluid chamber, or the like) into the second residue cavity. In some embodiments the first residue cavity 150 and/or the second residue cavity may be operatively coupled to each other, and/or otherwise be a single residue cavity. From there, the resulting solution, along with any other remaining residual fluids, may exit the first fluid chamber 130 and/or the second fluid chamber via their respective drain ports 192 (or through a single drain port, or the like) and exit the housing 110 via the one or more drain ports 192 (or through a single drain port aperture 192A of the second end member 169).

In some embodiments, the interiors of the first fluid chamber 130 and the second fluid chamber may be rinsed (e.g., using distilled water, tap water, filtered water or some other rinsing fluid) to remove any remaining residue. As such, in some embodiments, rinsing fluid may be introduced through one or more of the intake apertures (e.g., through both the first fluid intake aperture 131A and the second fluid intake aperture 161A, or the like) of the second end member 169 (or the first end member 139 depending one where the intake apertures are located) into the respective fluid chambers in a first position (or other position). In some embodiments, once rinsing fluid has been allowed to flow into the fluid chambers, the housing 110 may be rotated (e.g., to a second position, or another position, and/or back) multiple times to allow rinsing fluid to rinse the various passageways and cavities within the fluid chambers. The rinsing fluid in both fluid chambers may then exit the housing via the one or more drain port apertures 192A as previously described with respect to the residual fluids. The foregoing process may be referred to herein as a "rinse" cycle.

In other embodiments, the rinsing fluid entering the fluid chambers may be pressurized such that the housing 110 does not need to be rotated in order for the rinsing fluid to reach the interior surfaces of the fluid chambers. The rinsing fluid may then be evacuated (e.g., using a vacuum, or other like component) through the one or more drain port apertures (e.g., the drain port aperture 192A). The foregoing process may be referred to herein as a "wash" cycle. It should be understood that the rinse and/or wash cycle may be independently and/or collectively determined to be a "rinsing" cycle. Once a rinsing cycle (e.g., a rinse and/or wash cycle) has been applied, the apparatus 101 may be ready to accept another set of fluid samples.

FIG. 4 illustrates the first side of the assembled chemical indicator apparatus 101. The first end member 139 is operatively coupled, removably or permanently, to the first fluid chamber 130 to form a seal that prevents fluids from escaping the first fluid chamber 130 at the edges of the first end member 139. To this end, the first end member 139 and/or the first fluid chamber 130 may comprise a sealant, grommet, o-ring, compressed elastomer seal or other type of sealing material or compound along the edges of the first end member 139 and/or the first fluid chamber 130, as well as all other openings therein. In this way, the first end member 139 may completely seal the interior (e.g., the first fluid chamber 130, the measuring cavities, and the like) to prevent fluids from leaking from the first fluid chamber 130 and/or to shield against contaminants being introduced into the first fluid chamber 130. The viewport 191 allows for the visualization of any fluid that may be present within the mixing cavity 190.

FIG. 5 illustrates the second side of the assembled chemical indicator apparatus 101. The second end member 169 is operatively coupled, removably or permanently, to the second fluid chamber to form a seal that prevents fluids from escaping the second fluid chamber at the edges of the second end member 169. Accordingly, the second fluid chamber and/or the second end member 169 may have one or more types of sealing material, grommet, o-ring, or compound distributed along their respective edges and all other openings as described elsewhere herein. The first fluid aperture 131A, the second fluid aperture 161A, and/or the one or more drain port apertures (e.g., drain port aperture 192A) may be removably connected to pipes, tubes, or other types of conduits to deliver fluid to and/or remove fluid from the first fluid chamber 130 and/or the second fluid chamber.

In an alternative embodiment, the first end member 139, rather than being a separate component from the first housing portion 112, may instead be integrated with the first housing portion 112. Likewise, the second end member 169, rather than being a separate component from the second housing portion 114, may be integrated with the second housing portion 114. In such embodiments, the first housing portion 112 (which includes the first end member 139) and the second housing portion 114 (which includes the second end member 169) may be connected to the divider 116 to form the apparatus.

FIG. 6 illustrates another embodiment of the chemical indicator apparatus 201, like the chemical indicator apparatus 101 illustrated in FIGS. 2 through 5. The apparatus 201 may comprise a housing 210 which is separated into a first housing portion 212 and a second housing portion 214 by a divider 216. The first housing portion 212 may comprise a first end member 239 which may be removably or permanently attached to the first housing portion 212 to define an interior space therein (e.g., a first fluid chamber, or the like), and likewise, the second housing portion 214 may comprise a second end member 269 which may be removably or permanently attached to the second housing portion 214 to define an interior space therein (e.g., a second fluid chamber, or the like). The first housing portion 212 may comprise a first detection fluid intake port 231 and a first rinsing fluid intake port 232 which fluidly connects the interior of the first housing portion 212 with the exterior of the housing 210. Similarly, the second housing portion 214 may comprise a second detection fluid intake port 261 and a second rinsing fluid intake port 262 which fluidly connect the interior of the second housing portion 214 with the exterior of the housing 210. However, as previously discussed, these intake ports may be comprised of one or more ports and other components that allow for delivering different types of fluids to the chemical indicator apparatus 201. Fluids may be introduced into the one or more various intake ports 231, 232, 261, 262 by various types of conduits (e.g., pipes, tubes, funnels, or the like), where the fluids may enter the intake ports 231, 232, 261, 262 through gravity and/or a pressurized system wherein fluids are actively pumped into the interior of the apparatus 201.

The first end member 239 may comprise a viewport 291 which allows for the visualization of the interior of the housing 210. The first end member may further comprise a pivot aperture 222 (e.g., hole of any cross-section, or the like) which may be removably or permanently coupled to an actuation member (e.g., the actuation member 21 coupled to the mechanical actuator 20 as shown in FIG. 1, or the like) such that the housing 210 may be rotated along an axis defined longitudinally by the actuation member.

FIG. 7 illustrates an additional embodiment of the chemical indicator apparatus 201 shown in FIG. 6. In such embodiments, the first end member 239 may comprise a color sensor PCB 294 positioned adjacent to the viewport 291. The color sensor PCB 294 allows for the detection of a color (e.g., a wavelength, or the like) of a substance that is visible through the viewport 291. In this way, the apparatus may use the color sensor PCB 294 to obtain a quantitative analysis of the substance within the apparatus 201.

FIG. 8 illustrates an interior view of the first side of the chemical indicator apparatus 201 in a first position. The interior of the first housing portion 212 may be defined by a first fluid chamber 230. The first fluid chamber 230 may comprise a first measuring cavity 240 defined by one or more walls (e.g., a first sidewall 240A and a second sidewall 240B connected by a floor 240C, or the like). The first measuring cavity 240 may be positioned adjacent (e.g., below, or the like) the first detection fluid intake port 231 and the first rinsing fluid intake port 232 in the first position such that fluid entering the first fluid chamber 230 via either intake port 231, 232 may fill the first measuring cavity 240. The first measuring cavity 240 may comprise a substantially vertical segment and a curved segment that extends horizontally inward toward the interior of the first measuring cavity 240 (e.g., first sidewall 240A) when the housing 210 is in the first position. The vertical segment of the first sidewall 240A may be shorter in length than a second segment (e.g., the second sidewall 240B) such that any fluid in excess of the maximum capacity of the first measuring cavity 240 may flow over the first segment of the first measuring cavity 240 (e.g., the first sidewall 240A) into a first residue cavity 250 within the first fluid chamber 230.

The second segment of the first measuring cavity 240 (e.g., the second sidewall 240B) may also comprise a substantially vertical segment and a lateral segment which extends laterally into a mixing cavity 290, which may be defined by one or more mixing cavity walls (e.g., defined by an interior wall of the first housing portion 212 and a dividing member 290A). In this way, the fluid within the first measuring cavity 240 may, when the housing is oriented in a second position (e.g., by rotating the housing 210 using the pivot hole 222) such that the mixing cavity 290 is oriented adjacent the bottom of the rotated apparatus 201, flow across the second segment of the first measuring cavity 240 (e.g., the second sidewall 240B) into the mixing cavity 290. At least a portion of the one or more mixing cavity walls (e.g., the dividing member 290A) may extend into the first residue cavity 250 to partially define the first residue cavity 250. In this way, any residual fluid existing within the first fluid chamber 230 when the housing 210 is rotated into the second position will remain in at least a portion of the first residue cavity 250 (e.g., flow into a space defined by the dividing member 290A and an adjacent wall of the first housing portion 212) without contaminating the mixing cavity 290.

The first housing portion 212 may further comprise a first drain port 291A which fluidly connects the first residue cavity 250 with the exterior of the housing 210. The walls of the first housing portion 212 (e.g., interior surface of the walls) may be angled toward the first drain port 291A such that, when the housing 210 is oriented into the first position (or another like position), any fluid remaining in the first residue cavity 250 may flow down the interior walls of the first housing portion 212 via gravity and exit the first fluid chamber 230 via the first drain port 291A.

FIG. 9 illustrates an interior view of the second side of the chemical indicator apparatus 201 in the first position. The interior of the second housing portion 214 may be defined by a second fluid chamber 260. The second fluid chamber 260 may comprise a second measuring cavity 270 defined by one or more walls (e.g., a first sidewall 270A and a second sidewall 270B connected by a floor 270C, or the like). The second measuring cavity 270 may be positioned adjacent (e.g., below, or the like) the second detection fluid intake port 261 and the second rinsing fluid intake port 262 in the first position such that fluid entering the second fluid chamber 260 via either intake port 261, 262 may fill the second measuring cavity 270. The first measuring cavity 240 may comprise a substantially vertical segment and a curved segment that extends horizontally inward toward the interior of the second measuring cavity 270 (e.g., a first sidewall 270A) when the housing 210 is in the first position. The vertical segment of the first sidewall 270A may be shorter in length than a second segment (e.g., a second sidewall 270B) such that any fluid in excess of the maximum capacity of the second measuring cavity 270 may flow over the first segment of the second measuring cavity 270 (e.g., the first sidewall 270A) into a second residue cavity 280 within the second fluid chamber 260.

The second segment of the second measuring cavity 270 (e.g., the second sidewall 270B) may also comprise a substantially vertical segment and a lateral segment which extends laterally into the mixing cavity 290, which may be defined by one or more mixing cavity walls (e.g., defined by an interior wall of the second housing portion 214 and a dividing member 290B). It should be noted that the mixing cavity 290 fluidly connects the two fluid chambers 230, 260, such that the first fluid and second fluid may be mixed within the mixing cavity 290. In this way, the fluid within the second measuring cavity 270 may, when the housing is oriented in the second position (e.g., by rotating the housing 210 using the pivot hole 222) such that the mixing cavity 290 is oriented adjacent the bottom of the rotated apparatus 201, flow across the second segment of the first measuring cavity 240 (e.g., the second sidewall 270B) into the mixing cavity 290. At least a portion of the one or more mixing cavity walls (e.g., the dividing member 290B) may extend into the second residue cavity 280 to partially define the second residue cavity 280. In this way, any residual fluid existing within the second fluid chamber 260 when the housing 210 is rotated into the second position will remain in at least a portion of the second residue cavity 280 (e.g., flow into a space defined by the dividing member 290B and an adjacent wall of the second housing portion 214) without contaminating the mixing cavity 290.

The second housing portion 214 may further comprise a second drain port 291B which fluidly connects the second residue cavity 280 with the exterior of the housing 210. The walls of the second housing portion 214 (e.g., interior surface of the walls) may be angled toward the second drain port 291B such that, when the housing 210 is oriented into the first position (or another like position), any fluid remaining in the second residue cavity 280 may flow down the interior walls of the second housing portion 214 via gravity and exit the second fluid chamber 260 via the first drain port 291B.

FIGS. 10 through 14 illustrate a method of using the chemical indicator apparatus 201, in accordance with some embodiments. In an exemplary embodiment, the chemical indicator apparatus 201 may be used to determine whether a particular disinfectant solution (e.g., a PAA solution) contains a minimum recommended concentration of disinfectant. Turning now to FIG. 10, which shows an internal view of the first side of the chemical indicator apparatus 201, the method may begin when both fluid chambers 230, 260 are empty. A first fluid may be introduced into the first fluid chamber 230 via the first detection fluid intake port 231, while a second fluid may be simultaneously introduced into the second fluid chamber 260 via the second detection fluid intake port 261. The flow path of the first fluid is depicted by the directional arrows in FIG. 10. The volume of the first fluid may be adjusted to exceed the maximum capacity of the first measuring cavity 240 such that the first measuring cavity 240 is filled to capacity and any excess fluid flows into the first residue cavity 250 and out through the drain port 291A. Similarly, the volume of second fluid may be adjusted to "overfill" the second measuring cavity 270 such that excess fluid flows into the second residue cavity 280 and out through the drain port 291B. Because the individual capacities of the first measuring cavity 240 and the second measuring cavity 270 are known, the process described herein allows for the accurate measurement of the quantities of first fluid and second fluid to be combined in the mixing cavity 290.

FIG. 11 shows the chemical indicator apparatus 201 after it has been rotated to a second position about the pivot hole 222 in the direction of the rounded and curved directional arrow. It should be understood that in some embodiments the second position is a different rotational position from the first position, such as oriented perpendicular to the first position (e.g., about 90 degrees+/−10 degrees, or the like), substantially perpendicular to the first position (e.g., 70 to 120 degrees), generally perpendicular to the first position (e.g., 45 degrees to 135 degrees)

Regardless of the specific position, in the second position, the first fluid within the first measuring cavity 240 flows into the mixing cavity, and likewise, the second fluid within the second measuring cavity 270 also flows into the mixing cavity. Meanwhile, any excess fluid within the first residue cavity 250 that has not been drained through the first drain port 291A may flow into the space within the first residue cavity 250 defined by an adjacent wall of the first housing portion 212 and the dividing member 290A. Likewise, any excess fluid within the second residue cavity 280 that has not been drained through the first drain port 291B may flow into the space within the second residue cavity 280 defined by an adjacent wall of the second housing portion 214 and the dividing member 290B.

FIG. 12 shows the chemical indicator apparatus 201 after the first fluid and the second fluid have entered the mixing cavity 290. In some embodiments, the first fluid may be a PAA indicator and the second fluid may be a PAA disinfectant solution. Upon entering the mixing cavity 290, the first fluid may mix with the second fluid to form a single resulting solution. The housing 210 may be agitated by being rotated around the longitudinal axis of the pivot hole 222 across a predefined range of motion (e.g., a predefined angle from the vertical axis—as previously discussed herein) multiple times to allow the resulting solution to be mixed thoroughly within the mixing cavity 290. If the resulting solution has a PAA concentration above the minimum recommended concentration threshold, the resulting solution may change color (e.g., from clear to green, or the like). Otherwise, the resulting solution may not change in appearance. In some embodiments, such as when a color sensor PCB is used, the red, green, blue, and white levels of the sensor may be calibrated to baseline values before the measurement is conducted. In this way, the system may compensate for signal attenuation or interference that may occur over time, such as interference that may be caused by build-up on or around the viewport 291 or the transparent cover of the viewport 291.

FIG. 13 shows the chemical indicator apparatus 201 after the resulting solution has been analyzed. The apparatus 201 may be rotated back to the first position (or another position) such that the resulting solution flows across the dividing members 290A, 290B and into the first residue cavity 250 and/or the second residue cavity 280. Any remaining fluids within either residue cavity 250, 280 (or a single residue cavity formed from the combination thereof) may then exit the apparatus through the respective drain ports 291A, 291B (e.g., via gravity) or a single drain port.

The steps as described with respect to FIGS. 10 through 13 may also represent the steps of a rinsing cycle (e.g., a rinse or wash cycle). In such embodiments, instead of introducing a first fluid and second fluid into the apparatus 201, rinsing fluid (or rinsing solution) may flow into the first fluid chamber 230 via the first rinsing fluid intake port 232, and may also flow into the second fluid chamber 260 via the second rinsing fluid intake port 262. The housing 210 may then be rotated between the first and second positions (or other positions) as described above regarding FIGS. 10-13 to allow rinsing fluid to remove any remaining solutions and/or chemicals within either fluid chamber 230, 260.

FIG. 14 shows a method for rinsing the chemical indicator apparatus 201 with rinsing fluid. In particular, the apparatus 201 may remain fixed in the second position while pressurized rinsing fluid is injected into the first rinsing fluid intake port 232 and the second rinsing fluid intake port 262; however, the chemical indicator apparatus 201 may be flushed while located in other positions (e.g., a first position, or the like). In such embodiments, the pressurized rinsing fluid may contact the surfaces within the first fluid chamber 230 and the second fluid chamber 260 to remove any remaining solutions and/or chemicals. The pressurized rinsing fluid may be removed via suction through the drain ports 291A, 291B until all of the residue has been removed from within the fluid chambers 230, 260. In other embodiments, the pressure of the rinsing fluid alone may be sufficient to remove the rinsing fluid from within the fluid chambers 230, 260. In some embodiments, pressurized air (e.g., heated and/or compressed air) may be introduced through the fluid ports 231, 232, 261, 262 to dry the interior of the apparatus 201. Once the apparatus 201 has been dried, the apparatus 201 may then be ready for another measurement. It should be understood that the rinse cycle may be independently and/or collectively referred to as a rinsing cycle.

FIG. 15 illustrates another embodiment of the chemical indicator apparatus 301 as seen from a first side, in accordance with some embodiments. The apparatus 301 may comprise a housing 310 which may be separated into a first housing portion 312 and a second housing portion 314 by a divider 316. The first housing portion 312 may be attached to a first end member 339 to define an interior space therein (e.g., the first fluid chamber 330), and the second housing portion 314 may be attached to a second end member 369 to define an interior space therein (e.g., the second fluid chamber 360). The apparatus may further comprise a plug 393A which is attached to a mount 393B. The plug 393A may allow the housing 310 to rotate about a longitudinal axis extending lengthwise through the center of the plug 393A. In some embodiments, the housing 310 may be removably attached to an actuation member of a mechanical actuator. The plug 393A may comprise one or more fluid intake and/or drain apertures and fluid passageways to deliver fluid into and remove fluid from the interior of the fluid chambers 330, 360.

FIG. 16 illustrates the chemical indicator apparatus 301 from a second side, in accordance with some embodiments. The mount 393B may comprise a circular mold dimensioned to accept the plug 393A and a base that allows the mount 393B to sit flush with a substantially flat surface. The mount 393B may further comprise a set of tension screws 393BB which allows for the adjustment of the tightness of the circular mold. In this way, the degree of retention of the plug 393A may be adjusted.

The plug 393A may comprise a first fluid intake port 331A, a second fluid intake port 361A, and a drain port 391A located on a second end of the plug 393A. Each of the ports may comprise a nipple which allows a conduit (e.g., a tube, pipe, hose, or the like) to be removably attached. The plug 393A may further comprise a unique passageway for each of the ports, where each passageway is located on the interior of the plug 393A such that fluids may be pumped into or out of the interior of the plug 393A through the ports 331A, 361A, 391A.

FIG. 17 shows the plug 393A in more detail, in accordance with some embodiments. In particular, the plug 393A may comprise a first fluid aperture 331B which is fluidly connected with the first fluid intake port 331A via a first fluid passageway within the plug 393A, a second fluid aperture 361B which is fluidly connected with the second fluid intake port 361A via a second fluid passageway within the plug 393A, and a first drain aperture 391D and a second drain aperture 391E, where both drain apertures 391D, 391E are fluidly connected with the drain port 391A via a drain passageway within the plug 393A.

When the plug 393A is inserted through the housing 310 and retained by the base 393B, the first fluid aperture 331B and the first drain aperture 391D may be aligned with the first fluid chamber 330, while the second fluid aperture 361B and the second rain aperture 391E may be aligned with the second fluid chamber 360. In such a configuration, a first fluid may be introduced into the first fluid intake port 331A of the plug 393A, through the first fluid passageway, and out of the first fluid aperture 331B into the first fluid chamber 330. A second fluid may be introduced into the second fluid intake port 361A of the plug 393A, through the second fluid passageway, and out of the second fluid aperture 361B into the second fluid chamber 360. Finally, fluid within the first fluid chamber 330 may be drained through the first drain aperture 391D, while fluid within the second fluid chamber 360 may be drained through the second drain aperture 391E. Fluid drained from either fluid chamber 330, 360 may pass through the drain passageway and out through the drain port 391A of the plug 393A.

FIG. 18 illustrates an interior view of the apparatus 301 from the first side in a first position, in accordance with some embodiments. In particular, the first housing portion 312 may comprise a first fluid chamber 330, which in turn comprises a first detection fluid intake port 331 which, when the plug 393A is in a first position, is aligned with the first fluid aperture 331B. In such a configuration, a first fluid may be pumped into the plug 393A such that the first fluid flows into a first measuring cavity 340 within the first fluid chamber 330. The first measuring cavity 340 may be defined by one or more walls (e.g., a first sidewall 340A and a second sidewall 340B, or the like). A portion of the first measuring cavity 340 may comprise a first segment, which is oriented laterally upwardly and a second segment which is oriented laterally and substantially downwardly (e.g., collectively the first sidewall 340A), such that any excess fluid flows over the first sidewall 340A and onto a dividing member 390A. The dividing member 390A may be angled downward such that the excess fluid may run along the dividing member 390A into a first residue cavity 350 within the first fluid chamber 330. The excess fluid may then exit the apparatus 301 flowing through the drain port 391E of the first fluid chamber 330, into the drain aperture 391B, and out through the drain port 391A of the plug 393A.

Turning now to FIG. 19, which illustrates an interior view of the apparatus 301 from the second side in the first position, the second housing portion 314 may comprise a second fluid chamber 360, which in turn comprises a second detection fluid intake port 361 which, when the plug 393A is in the first position, is aligned with the second fluid aperture 361B. In such a configuration, a second fluid may be pumped into the plug 393A such that the second fluid flows into a second measuring cavity 370 within the second fluid chamber 360. The second measuring cavity 370 may be defined by one or more walls (e.g., a first sidewall 370A and a second sidewall 370B, or the like). A portion of the second measuring cavity 370 may comprise a first segment which is oriented laterally upwardly and a second segment which is oriented laterally and substantially downwardly (e.g., first sidewall 370A, such that any excess fluid flows over the first sidewall 370A and onto a dividing member 390B. The dividing member 390B may be angled downwardly such that the excess fluid may run along the dividing member 390B into a second residue cavity 380 within the second fluid chamber 360. The excess fluid may then exit the apparatus 301 flowing through the drain port 391F of the second fluid chamber 360, into the drain aperture 391B, and out through the drain port 391A of the plug 393A.

FIG. 20 shows an interior view of the apparatus 301 from the first side in the first position with the housing 310 rotated around the plug 393A in a second position, in accordance with some embodiments. In some embodiments the second position may be oriented about 45 degrees from the first position (e.g., a horizontal position), or anywhere between 40 and 50 degrees, 35 and 55 degrees, 30 and 60 degrees, 25 and 65 degrees, 15 and 75 degrees, 5 and 85 degrees, or the like as described herein, which respect to the first position of the housing 310. Once the first measuring cavity 340 has been intentionally overfilled, the housing 310 can be rotated with respect to the plug 393A such that the first fluid aperture 331B is no longer aligned with the first detection fluid intake port 331 within the first fluid chamber 330. At this stage, the first fluid is no longer flowing into the first fluid chamber 330. Instead, any extraneous fluid flows into a secondary residue cavity 350C of the first fluid chamber 330 through the secondary first fluid port 331C. In turn, any extraneous fluid within the secondary residue cavity 350C may exit the apparatus 301 via the secondary drain port 391C and out through the drain port aperture 391B and the drain port 391A of the plug 393A.

Meanwhile, FIG. 21 shows an interior view of the apparatus 301 from the second side in the rotated around the plug 393A into the second position, in accordance with some embodiments. Once the second measuring cavity 370 has been intentionally overfilled, the housing 310 is rotated with respect to the plug 393A such that the second fluid aperture 361B is no longer aligned with the second detection fluid intake port 361 within the second fluid chamber 360. In the second position, the second fluid is no longer flowing into the second fluid chamber 360. Instead, any extraneous fluid flows into a secondary residue cavity 380D of the second fluid chamber 360 through the secondary second fluid port 361D. In turn, any extraneous fluid within the secondary residue cavity 380D may exit the apparatus 301 via the secondary drain port 391D and out through the drain port aperture 391B and the drain port 391A of the plug 393A.

Referring again to FIG. 20, at this stage, the housing 310 is in a second position such that the mixing cavity 390 is oriented at the adjacent (e.g., near the bottom, or the like) of the apparatus 301, thereby allowing the measured first fluid within the first measuring cavity 340 to flow across the first sidewall 340A into the mixing cavity 390. Likewise, referring to FIG. 21, the measured second fluid within the second measuring cavity 370 may flow across the first sidewall 370A into the mixing cavity 390, thereby mixing with the first fluid to form a resulting solution. The housing 310 may be agitated as described herein to promote thorough mixing of the resulting solution. Once the resulting solution has been mixed, the color changes (if any) of the resulting solution may be detected using the methods described herein.

After the resulting solution has been analyzed, the housing 310 may be rotated back to the first position (or another position) to allow the resulting solution to flow into the first residue cavity 350 and/or the second residue cavity 380. The plug 393A may then be rotated back to the first position as shown in FIGS. 18 and 19 to allow the residual fluid within the residue cavities 350, 380 to exit the apparatus 1 via the drain port 391A of the plug 393A. It should be understood by those having ordinary skill in the art that the intake ports 331A, 361A, and drain port 391A of the plug 393A may further be used to circulate rinsing fluid and/or rinsing solutions throughout the fluid chambers 330, 360 to create a rinsing cycle as described herein. Once the apparatus 301 has been rinsed, the apparatus 301 is ready to take additional measurements.

FIG. 22 illustrates an alternative embodiment of the chemical indicator detection apparatus 401, in accordance with some embodiments of the present disclosure. The apparatus 401 may comprise a housing 410 which may comprise a fluid chamber 430 therein. The housing 410 may be constructed using polycarbonate, glass, or other material. The fluid chamber 430 may be fluidly coupled with one or more fluid ports through which fluid may enter or exit the fluid chamber 430. For instance, the one or more fluid ports may comprise one or more fluid intake ports (e.g., a first fluid intake port 431 through which a first fluid may flow, and a second fluid intake port 461 through which a second fluid may flow) and/or one or more drain ports (e.g., a fluid residue port 492). The one or more fluid lines may flow through the one or more fluid ports, where each fluid line may comprise a check valve 417 (e.g., in some embodiments located within the body of the housing 410), which prevents the backflow of fluid. In this way, the check valves 417 may prevent contamination of the fluids contained within the fluid lines and allow for unidirectional fluid motion. In some embodiments, the first fluid intake port 431 and/or the fluid line corresponding to the first fluid intake port 431 may further comprise a first fluid valve 417A which may be actuated to stop and/or start the flow of the first fluid through the first fluid intake port 431. The first fluid valve 417A may prevent contamination of fluids as well as to prevent unnecessary waste. In some embodiments, the housing 410 may further comprise a sensor 418 (e.g., a color sensor, PCB, or the like) which may detect the color of the solution within the fluid chamber 430.

The housing 410 may further comprise a piston 411 therein which forms a seal between the fluid chamber 430 and the exterior of the housing 410. The housing 410 may also comprise one or more sets of sealing members 416 (e.g., o-rings, grommets, washers, or the like) which may prevent the leakage of fluids between the piston 411 and the housing 410. The piston 411 may be configured to move in and out of the housing 410 to, using positive and/or negative pressure, expel fluids from within the fluid chamber 430 and to allow for fluids to be introduced into the fluid chamber 430, respectively. In some embodiments, the piston 411 may be operatively coupled to a shaft 414 (e.g., a leadscrew, or the like) such that the piston may be actuated manually, via a powered motor 415, or other driving mechanism. In some embodiments, the piston 411 may be retained by an antirotation pin 413 which may mate with a groove located in the piston 411. The piston may further be operatively coupled to a limit switch 412 which may limit the travel of the piston 411 into and out of the fluid chamber 430 (e.g., to prevent the over-extension).

The apparatus 401 as shown in FIG. 22 may be used to perform a "read" operation of a fluid (e.g., a disinfectant solution). The operation begins by closing the first fluid valve 417A and moving the piston 411 in the outward direction (e.g., down) to draw air and the second fluid into the fluid chamber 430 through the second fluid intake port 461. At this step, the check valve 417 of the fluid residue port 492 prevents fluids from being introduced into the fluid chamber 430 through the fluid residue port 492. The piston 411 may then be moved in the inward direction (e.g., up) to expel air and fluids from the fluid chamber 430 through the fluid residue port 492. The check valves 417 of the first fluid intake port 431 and the second fluid intake port 461 may ensure that fluids only exit the fluid chamber 430 through the fluid residue port 492.

Subsequently, the first fluid valve 417A may be opened and the piston 411 may move in the outward direction to draw equal volumes of first fluid and second fluid through the first fluid intake port 431 and the second fluid intake port 461 respectively. The piston 411 may then be held at a static position while the color of the resulting solution is detected (e.g., by visual analysis or via the sensor 418). Once the color has been successfully detected, the first fluid valve 417A may be closed and the piston may be moved in the inward direction to expel the fluid within the fluid chamber 430 through the fluid residue port 492.

In some embodiments, the apparatus 401 may be used to perform a "rinse" operation. The rinse operation may begin by connecting the second fluid port 461 to a rinse solution reservoir (e.g., water). While the first fluid valve 417A is closed, the piston 411 may be moved outward to draw rinse solution into the fluid chamber 430. The piston 411 may then be moved inward to expel rinse solution and any other remaining fluids from the fluid chamber 430 via the fluid residue port 492. The piston 411 may be actuated multiple times to repeatedly cycle rinse solution through the fluid chamber 430.

In some embodiments, the apparatus 401 may also be used to perform a "purge" operation. In some embodiments, the purge operation may be performed after the rinse operation. Accordingly, the purge operation may begin by connecting the second fluid port 461 to an air source (e.g., ambient air, pressurized air reservoirs, or the like). While the first fluid valve 417A is closed, the piston 411 may be moved outward to draw air and residual rinse solution into the fluid chamber 430. The piston 411 may subsequently be moved inward to expel air and residual rinse solution from the fluid chamber 430 via the fluid residue port 492. The piston 411 may be actuated multiple times to repeatedly cycle air through the circuit and/or the fluid chamber 430, until the fluid chamber 430 is sufficiently free of residual fluids. At this step, the apparatus 401 may be used to perform another read operation.

FIG. 23 is a schematic diagram illustrating other embodiments of the chemical indicator detection system, in accordance with some embodiments of the present disclosure. The system 501 may comprise a fluid pump 595 in fluid communication with a first fluid source 596 and a second fluid source 597. In particular, the first fluid source 596 may be a reservoir or a container, which may contain a first fluid to be provided to the fluid pump 595. The first fluid may be a chemical indicator solution for detecting a concentration of a disinfectant. In this regard, the first fluid source 596 may be fluidly connected (e.g., via a pipe, fluid line, hose, or the like, which may be referred to hereafter as a "fluid path") to the fluid pump 595 via a first pump inlet 551 of the fluid pump 595. The first pump inlet 551 may be fluidly connected to a first fluid chamber within the fluid pump 595, as will be described in further detail below. The fluid path from the first fluid source 596 to the fluid pump 595 may comprise one or more inline valves, such as a check valve 517, which prevents backflow of the first fluid into the first fluid source 596, and a solenoid valve 517A which may be actuated to allow fluid to pass through (e.g., the solenoid valve 517A is open) or block fluid from passing through (e.g., the solenoid valve 517A is closed). In some embodiments, the fluid path from the first fluid source 596 to the fluid pump 595 may further comprise a wet/dry sensor 599 which may be configured to detect the wetness and/or dryness of the fluid path, which may in turn indicate the degree of saturation of the fluid path by the first fluid.

The second fluid source 597 may be a reservoir which may contain a second fluid to be provided to the fluid pump 595, where the second fluid may be a disinfectant solution (e.g., PAA powder or liquid mixed with water, a pre-mixed disinfectant solution, or the like) to be tested by the system 501 or a rinsing fluid (e.g., water, or the like). In this regard, the second fluid source 597 may be fluidly connected to the fluid pump 595 at the first pump inlet 551 via a first fluid path and at a second pump inlet 552 via a second fluid path. The second pump inlet 552 may be fluidly connected to a second fluid chamber within the fluid pump 595, as will be described in further detail below. The first fluid path between the second fluid source 597 and the fluid pump 595 may comprise a check valve 517, which prevents backflow of the second fluid into the second fluid source 597, and a solenoid valve 517A which may be opened or closed to control the flow of the second fluid into the first pump inlet 551. The second fluid path between the second fluid source 597 and fluid pump 595 may also comprise a check valve 517 to ensure the flow of the second fluid into the fluid pump 595 via the second pump inlet 552.

As will be described in further detail below, the fluid pump 595 may be configured to intake a quantity of first fluid (e.g., chemical indicator solution) from the first fluid source 596 and a quantity of second fluid (e.g., disinfectant solution) from the second fluid source 597 in two chambers. Thereafter the first fluid (e.g., chemical indicator solution) is mixed with the second fluid (e.g., disinfectant solution) within the fluid pump 595 (e.g., within a mixing cavity such as a shared line or chamber in the fluid pump) or otherwise sent to a mixing cavity outside of the fluid plump 595 such as at the sensor 518 location. Each fluid path leading out of the fluid pump 595 may comprise one or more check valves 517 to prevent the backflow of fluid mixture into the fluid pump 595. Regardless of the location of the mixing of the fluids, the sensor 518 is then used to determine the fluid mixture disinfectant concentration. The sensor 518 may be configured to detect one or more quantifiable attributes regarding the fluid mixture. For instance, the sensor 518 may comprise a color sensor which may be configured to detect an absorbance of the fluid mixture at certain specified wavelengths (e.g., 560 to 520 nm, or the like).

Once the sensor 518 has completed its analysis of the fluid mixture received from the fluid pump 595, the fluid mixture may be pumped out of the sensor 518 (e.g., mixing cavity in the sensor 518, mixing cavity 518 in the fluid pump 595 should the sensor be located with the fluid pump 595, or the like) into a drain 591. In some embodiments, the fluid line between the sensor 518 and drain 591 may comprise a check valve 517 to prevent backflow of the fluid mixture into the sensor 518. The system 501 may then be restored to a ready state after one or more purge and/or rinse cycles.

An exemplary method for using the system 501 is provided below for illustrative purposes. The system 501 may be used to assess whether a disinfectant solution (e.g., a PAA solution) has a concentration which meets or exceeds a certain specified threshold. In such a case, the first fluid source 596 may comprise a chemical indicator solution which may change the color of a disinfectant solution from clear (e.g., a first color) to green (e.g., a second color) when the concentration of the disinfectant meets or exceeds the threshold, and the second fluid source 597 may contain the disinfectant to be tested using the system 501.

The method may begin by priming the system 501 for testing (which may be referred to hereinafter as a "priming phase"). In this regard, the solenoid valve 517A of the fluid path between the first fluid source 596 and the first chamber 530 of the fluid pump 595 (which may be referred to hereinafter as the "chemical indicator line" or "CI line") is open, and the solenoid valve 517A of the first fluid path between the second fluid source 597 and the fluid pump 595 (which may be referred to hereinafter as the "disinfectant line") is closed. The fluid pump 595 may pump the first fluid from the first fluid source 596 into the fluid lines for a set number of cycles depending on the volume of the first fluid chamber and/or the volume of the CI line to ensure that the CI line is saturated with the first fluid (e.g., air has been evacuated from the CI line). In some embodiments, the fluid pump 595 may pump the first fluid until the wet/dry sensor 599 indicates that the CI line is wet. At this stage, the second pump inlet 552 may pump air into the second fluid chamber while the first fluid is being cycled into the CI lines. In other embodiments, the second pump inlet 552 may be connected to a container or chamber containing a rinsing fluid (e.g., water, or the like) such that the rinsing fluid is pumped into the second fluid chamber. In yet other embodiments, the second pump inlet 552 may be connected to the second fluid source 597 such that the second fluid is pumped into the second fluid chamber 560 (e.g., rinsing fluid from the second fluid chamber 560). The air and/or rinsing fluid to the second chamber and/or mixing cavity in the sensor 518 will be expelled to the drain 591.

After the system 501 has been primed, the sampling or testing phase may begin. The sampling phase may begin by closing the solenoid valve 517A on the CI line and opening the solenoid valve 517A on the disinfectant line. At this stage, the first pump inlet 551 and/or the second pump inlet 552 may be fluidly connected to the second fluid source 597. Accordingly, the fluid pump 595 may be used to clear air out of the second fluid source 597 lines (e.g., disinfectant lines) and fill them with the disinfectant solution. The number of cycles to saturate the second fluid path between the second fluid source 597 and the fluid pump 595 with the second fluid may vary based on the volume of the pump and the volume of the disinfectant lines.

Once the first fluid path has been primed with the first fluid (e.g., chemical indicator solution) and second fluid path has been primed with the second fluid (e.g., the disinfectant solution), the solenoid valve 517A on the CI line may be opened and the solenoid valve 517A on the disinfectant line may be closed. The pump may then be cycled once to pull the first fluid (e.g., CI solution) into the first fluid chamber and the second fluid (e.g., disinfectant) into the second fluid chamber and subsequently to push the first fluid and second fluid into a shared outlet port to create a fluid mixture leading to the mixing cavity in the fluid pump 595 or sensor 518. The sensor 518 may comprise a color sensor configured to detect the color of the tested solution. As previously discussed, the sensor 518 may be located in a housing with a mixing cavity or chamber to allow the fluids to mix. If the disinfectant solution has a concentration that meets or exceeds the specified threshold, the chemical indicator will cause the disinfectant solution to turn green (e.g., a second color), which in turn will cause the sensor 518 to detect positive values for absorbances at green wavelengths. On the other hand, if the concentration of disinfectant does not meet the specified threshold, the solution will remain clear (e.g., a first color) such that the sensor 518 may not detect positive absorbance values for the green wavelengths. Once the fluid mixture has been assessed, the fluid mixture may be removed from the system 501 via a drain 591. In this way, the system provides an efficient way to assess the sufficiency or suitability of disinfectant solutions.

After the sampling process, the system 501 may undergo a purging phase, which may begin by closing the solenoid valve 517A on the CI line and opening the solenoid valve 517A on the disinfectant line. The fluid pump 595 may then continuously operate until the second fluid source 597 has been emptied of the second fluid into the drain 591. In some embodiments, the purging phase may be followed by a rinsing phase, in which a rinse fluid (e.g., water) is added to the second fluid source 597 such that the rinse fluid is pumped out of the second fluid source 597 into the first fluid chamber and second fluid chamber of the fluid pump 595 and into the drain 591. After the purging and/or rinsing phases have been completed, the system 501 may be ready to be primed for additional testing.

FIG. 24 is a cross-sectional view illustrating a horizontal cross section of a chemical indicator pump of the chemical indicator detection system, in accordance with some embodiments. The chemical indicator pump may be, for example, the fluid pump 595 as illustrated FIG. 23. The fluid pump 595 may comprise a housing 510 comprising a first housing portion 512 comprising a first fluid chamber 530 and a second housing portion 514 comprising a second fluid chamber 560. The volume of the first fluid chamber 530 may be expanded and/or compressed by the movement of a first piston 511A, where the first piston 511A may be placed at a distal end of the first fluid chamber 530 and oriented such that the face of the piston 511A is perpendicular to the longitudinal axis of the first fluid chamber 530. When the first piston 511A moves in a first direction (e.g., a proximal direction), the first fluid chamber 530 is compressed such that any fluids therein may be expelled. Conversely, when the first piston 511A moves in a second direction (e.g., a distal direction), the first fluid chamber 530 is expanded such that fluids may be forced into the first fluid chamber 530 as a result of the negative pressure produced therein.

Furthermore, the first fluid chamber 530 may be fluidly connected with a first fluid port 551A, which may be a part of the first pump inlet 551 as illustrated in FIG. 23. Accordingly, the first fluid chamber 530 may receive the first fluid from the first fluid source 596 as the first piston 511A is moved in a distal direction from the first pump inlet 551A (e.g., via the fluid path between the first fluid source 596 and the fluid pump 595). The first fluid chamber 530 may further be fluidly connected with other fluid ports (e.g., a third fluid port 511B) to connect the first fluid chamber 530 with the second fluid source 597, as will be described in further detail with reference to FIG. 26.

Similar to that of the first fluid chamber 530, the volume of the second fluid chamber 560 may be expanded and/or compressed by the movement of a second piston 511B. The second fluid chamber 560 may be fluidly connected with a second fluid port (which may be part of the second pump inlet 552A as shown in FIG. 23) such that the second fluid chamber 560 may receive the second fluid from the second fluid source 597, as will be described in further detail with reference to FIG. 25. Both the first fluid chamber 530 and the second fluid chamber 560 may be fluidly connected to an outlet port 553A which may be a part of the one or more pump outlets 553 as shown in FIG. 23. Accordingly, any fluids within the first fluid chamber 530 and/or the second fluid chamber 560 may be expelled through the outlet port 553A. In some embodiments, the volumes of the first fluid chamber 530 and the second fluid chamber 560 may be the same such that equal amounts of first fluid and second fluid are drawn into the fluid pump 595. Alternatively, the first fluid chamber 530 and the second fluid chamber 560 may be sized or adjusted in order to set the desired amounts of fluid in each chamber 530, 560.

FIG. 25 is a cross-section view illustrating a vertical cross section of the chemical indicator pump, in accordance with some embodiments. In particular, FIG. 25 illustrates a third fluid port 552A fluidly connected to the first fluid chamber 530. The third fluid port 551B may be fluidly connected to the second fluid source 597 via the second fluid path between the second fluid source 597 and the fluid pump 595. Accordingly, in some embodiments, the first fluid chamber 530 may be configured to receive a chemical indicator solution, a disinfectant solution, or a rinsing fluid. Alternatively, the second fluid chamber 560 is configured to receive either a disinfector solution or a rinsing fluid.

FIG. 26 is a perspective isometric view illustrating the chemical indicator pump, in accordance with some embodiments. In particular, FIG. 26 illustrates a fluid pump 595 with a first fluid intake port 551A, a second fluid intake port 552A, and third fluid intake port 551B structured to receive fluids when the fluid pump 595 is in operation. In some embodiments, the first fluid intake port 551A and the third fluid intake port 552B may be oriented (e.g., at orthogonal angles from each other) to be fluidly connected with the first fluid chamber 530, while the second fluid intake port 552A may be oriented to be fluidly connected with the second fluid chamber 560. In such a configuration, the first fluid intake port 551A may be fluidly connected to the first fluid source 596, while the second fluid intake port 552A and third fluid port 551B may be fluidly connected to the second fluid source 597. Accordingly, the first fluid chamber 530 may be filled with either the first fluid or the second fluid depending on the state of the solenoid valves 517A of the CI line and the disinfectant line, respectively. For instance, if the solenoid valve 517A of the CI line is open and that of the disinfectant line is closed, the first fluid chamber 530 may be filled with the first fluid. Conversely, if the solenoid valve 517A of the disinfectant line is open and that of the CI line is closed, the first fluid chamber 530 may be filled with the second fluid (e.g., the disinfectant for purging the system, a rinse fluid for rinsing, or the like). In contrast, in some embodiments, the second fluid chamber 560 may be connected only to the second fluid source 560.

The first piston 511A and second piston 511B may be mounted on a piston mounting block 512, which in turn may be attached to an actuator 515. In some embodiments, the actuator 515 may be a motor which may be structured to move the mounting block 512 in a direction along the longitudinal axis of the first fluid chamber 530 and the second fluid chamber 560. In this way, the first piston 511A and second piston 511B may be actuated to pull fluids in to (e.g., via the fluid intake ports 551A, 551B, 552A) and expel fluids out from (e.g., via the outlet port 553) the first fluid chamber 530 and the second fluid chamber 560.

FIG. 27 is a perspective view illustrating a side view of the chemical indicator pump in a closed position, in accordance with some embodiments. As shown in FIG. 27, the mounting block 512 may be affixed to a shaft 513. In some embodiments, the shaft 513 may be a lead screw which may be attached to the actuator 515, which in some embodiments may be a rotational motor. At this stage, the mounting block 512 is in a fully extended position such that the mounting block 512 is in contact with a top limit switch 521A. The top limit switch 521A, when actuated by the mounting block 512, may signal to the system that the limit of travel in the proximal direction has been reached. In this position, the pistons 511A, 511B have pushed the fluids within the first fluid chamber 530 and the second fluid chamber 560 out through the outlet port such that said fluids pass through the sensor 518 and the check valve 517.

FIG. 28 is a perspective view illustrating a side view of the chemical indicator pump in an open position, in accordance with some embodiments. In this state, the mounting block 512 is in a fully withdrawn position such that the mounting block 512 is in contact with a bottom limit switch 521B. The bottom limit switch 521B, when activated, may signal to the system that the limit of travel in the distal direction has been reached. In this position, the pistons 511A, 511B have drawn fluid into the first fluid chamber 530 and the second fluid chamber 560 through the fluid intake ports 551A, 551B, 552A. Accordingly, the volume of fluid pumped into or out of the fluid chambers 530, 560 may be determined based on the volume calculated from the area of the face of the pistons 511A, 511B (e.g., the bore) multiplied by the distance traveled by the piston from the top limit switch 521A to the bottom limit switch 521B (e.g., the stroke).

Regardless of the type of chemical indicator apparatus used for determining the concentration of a disinfectant (e.g., the various embodiments described herein), the chemical indicator apparatus and/or system may be utilized in any type of device used to disinfect a product, and in particular, with respect to disinfecting medical devices. For example, the chemical indicator apparatus may be utilized in an apparatus that disinfects transesophageal probes (TEE probes), endoscopes, endocavity ultrasound probes (transvaginal probes), surface ultrasound probes, cystoscopies, duodenoscopes, ureteroscopes, and/or any other type of apparatus that is used to disinfect a probe or other medical device.

Chemical Indicator Solution

The chemical indicator solution may contain two components. First, there is a reducing agent that either completely consumes the peracid to a given threshold level or leaves unreacted peracid. Second, a detector reagent detects peracid that persists in the solution if sufficient reducing agent is not added to consume the peracid. An example of a reducing agent in a chemical indicator solution is sodium thiosulfate. This compound which is oxidized to the tetrathionate ion via the following half reaction:

$$2Na_2S_2O_3 \longrightarrow Na_2S_4O_6 + 2e^- + 2Na^+$$

This couples with the peracetic acid reduction half reaction:

$$CH_3COO\cdot OH + 2H^+ + 2e^- \longrightarrow H_2O + CH_3COOH$$

for the net neutralization reaction.

$2Na_2S_2O_3+CH_3COO\cdot OH+2H^+ \rightarrow Na_2S_4O_6+2Na^+ + H_2O+CH_3COOH$

In the color indicator solution, the potassium iodine has a catalytic role via the reaction series:

$CH_3COO\cdot OH+2H^++2I^- \rightarrow H_2O+CH_3COOH+I_2$ $2Na_2S_2O_3+I_2 \rightarrow Na_2S_4O_6+2I^-+2Na^+$ The iodine salt thus accelerates the overall rate of the neutralization reaction via an "iodine clock" reaction mechanism.

The water soluble molecule 2, 2'-azino-bis(3-ethylbenzothiazoline)-6-sulfonate diammonium salt (ABTS) provides an example of a detection reagent. The measurement endpoint with this compound is the oxidation of colorless ABTS to a green free-radical reaction product. This reaction is depicted in the reaction in the nearby Figure "Colorimetric Reaction for PAA Determination" with a stoichiometry for ABTS oxidation by PAA of one to one.

Colorimetric Reaction for PAA Determination

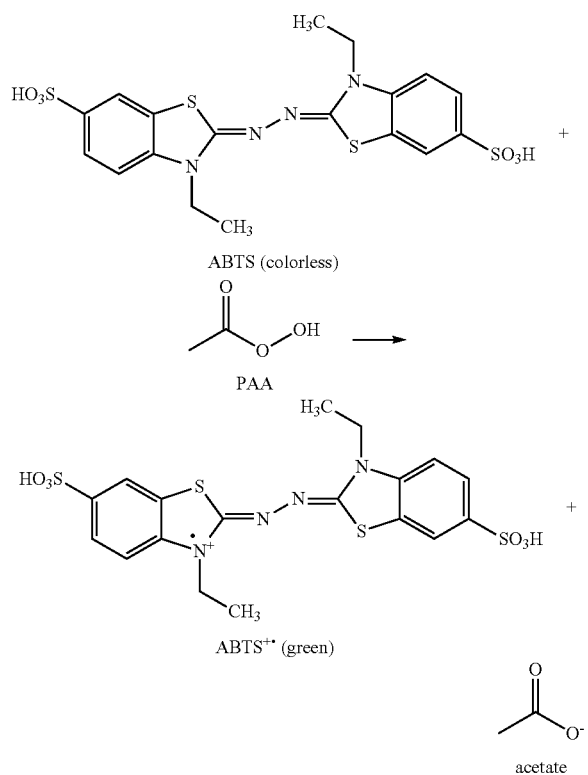

Based on the work of Pinkernell et al. (1997), ABTS is not oxidized by hydrogen peroxide, and thus the ABTS oxidation colorimetric endpoint reaction is specific for excess PAA in mixtures of $H_2O_2$ and PAA.

Example 1

The Endpoint Value can be Varied by Adjusting the Concentration of the Reducing Agent Based on the consideration regarding reducing agents presented above, increasing the concentration of the reducing agent in the color indicator solution should increase the endpoint value (threshold or cut-off value, the peracetic acid concentration at which the clear to green hue endpoint occurs). The experiment presented in this example demonstrates this point. The following examples may make reference to "fully active" PAA solution having a concentration of approximately 3% PAA. Accordingly, the concentrations disclosed herein for the components of the indicator solution (e.g., the sodium thiosulfate reducing agent) may reflect the assumption that the MRC of PAA is 2%. That said, it should be understood that the indicator solution may be formulated to detect endpoints for solutions having different concentrations of PAA (e.g., 1%, 1.25%, 1.5%, 1.75%, 2%, 2.25%, 2.5%, 2.75%, 3%, 3.25%, 3.5%, 3.75%, 4%, 5%, or the like). In such embodiments, the concentrations of the reducing agent (e.g., sodium thiosulfate) in the indicator solution may be adjusted upwards or downward in linear ratios depending on the minimum concentration of PAA to be detected, as will be shown below.

1. Formulations

Four color indicator solutions were prepared with the following composition:
12 mM, 13 mM, 14 mM, and 15 mM sodium thiosulfate ($Na_2S_2O_3$)
0.364 mM ABTS
0.120 mM KI
66 mM sodium acetate
pH=3.5

A peracetic acid formulation was prepared by solubilizing a mixture of two solids: sodium carbonate peroxyhydrate as a source of hydrogen peroxide when the solid contacts water and tetraacetylethylene-diamine which undergoes perhydrolysis to form peracetic acid.

2. Effect of Reducing Agent on Color Indicator Solution Performance: Titration of Color Indicator Solutions with Peracetic Acid Formulation The following procedure was used to determine the peracetic acid concentration at which the clear-to-green colorimetric endpoint occurred in the color indicator solutions with 12 mM, 13 mM, 14 mM, or 15 mM sodium thiosulfate. To prepare peracetic acid formulations with varying concentrations of the peracid, freshly prepared formulation with 3000 ppm peracid was mixed with "spent" peracetic acid formulation with 0 ppm peracid.

|  | Potency Failure | |
| --- | --- | --- |
| Dilution Factor | ul spent formulation | ul fully active formulation |
| 0.71 | 60.0 | 150.0 |
| 0.64 | 85.0 | 150.0 |
| 0.58 | 110.0 | 150.0 |
| 0.53 | 135.0 | 150.0 |

2.1. Measurement of Peracetic Acid Concentrations.

The level of peracetic acid in each dilution of spent and fresh peracid formulation was measured spectroscopically with the ABTS colorimetric reaction. Briefly, 20 ul portions peracetic acid formulation (fully active and diluted peracetic acid formulation from each well listed in Table 2.1. in Step 2.1 are diluted into 180 ul 100 mM acetate buffer, pH=3.5 in a 96 well plate for a 10× dilution. Each well at 10× dilution is further diluted by adding 20 ul to 180 ul of 36.4 mM ABTS in acetate buffer with 0.12 mM KI. The final dilution factor into the ABTS solution is 100× relative to the peracetic acid formulation. The ABTS solutions with 100× diluted peracetic acid formulation are progressively diluted ⅓ by mixing 50 ul+100 ul 100 mM acetate buffer, pH=3.5 down a series of wells in a 96 well plate. Typically, 3200 ppm peracetic acid in deionized water is utilized as a reference standard.

2.2. Measurement of Endpoint (Threshold or Cut-Off) Values.

Equal volumes of each chemical indicator solution (with 12 mM, 13 mM, 14 mM, or 15 mM sodium thiosulfate) was mixed with peracetic acid formulation at each dilution. The equal volume mixing was performed in a 96 well plate with 100 ul peracetic acid formulation being added to 100 ul chemical indicator solution. The clear-green endpoint value is estimated by measuring the absorbance of each well at 420 nm. The absorbance is plotted against the peracetic acid concentration (from the last step 2.1), and then the endpoint value is taken as the intercept with (blank) absorbance value.

3. Results

FIG. 29 is a line graph illustrating the results of the analysis as described above. The principal finding is that the endpoint value increases in an approximately linear manner with higher concentrations of reducing agents. For endpoint values above line 790 shown in FIG. 29, the resulting solution may be a first color (e.g., green), whereas endpoint values below the line may be a second color (e.g., clear). The important point is that the endpoint value can be selected to correspond to different peracid levels depending on the particular requirements of the analysis.

Example 2

The Precision of Color Indicator Solution Cut-Off in Two Fault Situations

The endpoint value was judged in two "fault" situations. With the first situation, to mimic a "potency failure" condition, a peracetic acid preparation with full potency is diluted with "spent" peracetic acid generation ability. This is the anticipated situation when a peracetic acid formulation is at the proper mass proportionality in water, but deficient in ability to generate the peracid. Secondly, to mimic a "potency dilution" condition, peracetic acid formulation with full potency is diluted with potable water. This is the potential case if, e.g., an error occurs by adding too much water.

1. Formulations

A color indicator solution was prepared with the following composition:
14 mM sodium thiosulfate ($Na_2S_2O_3$)
0.364 mM ABTS
0.120 mM KI
66 mM sodium acetate
pH=3.5
A peracetic acid formulation was prepared as described in Example 1 (Table 1.1).

2. Color Indicator Solution Performance with Diluted and Potency Failure Peracid Formulations.

The following procedure was used to determine the peracetic acid concentration at which the clear-to-green colorimetric endpoint occurred in the peracetic acid formulation under the two fault conditions: potency failure and dilutional failure. To prepare "potency failure" formulation, solids was solubilized under conditions which generate optimal "steady state" levels of free radical, then diluted with "spent" peracetic acid formulation. Dilutions of spent with fresh peracetic acid formulation were prepared as follows.

2.1. Preparation of Peracetic Acid Formulation Suspensions

"Fully active" 3.0% peracetic acid formulation was prepared by suspending 3.0 gr solid-phase peracetic acid formulation in 97 gr deionized water that had been pre-equilibrated at 40° C., stirring for 12 minutes while maintaining a temperature of 40° C., and preparing "spent" 3.0% peracetic acid formulation by incubating "fully active" peracetic acid formulation for one week at room temperature, conditions which result in the decay of measurable peracetic acid to zero. Peracetic acid formulation with progressively decreasing peracetic acid levels are prepared by mixing the following volumes (Table 1.2.1) of spent (Table 1.2.1a) or water (Table 1.2.1b) with fully active peracetic acid formulation in 96 well plates.

TABLE 2.1

Preparation of peracetic acid formulations

| | Potency failure | |
|---|---|---|
| Dilution Factor | ul spent formulation | ul fully active formulation |
| a) Potency failure | | |
| 1.00 | 0.0 | 150.0 |
| 0.79 | 40.0 | 150.0 |
| 0.75 | 50.0 | 150.0 |
| 0.72 | 57.5 | 150.0 |
| 0.70 | 65.0 | 150.0 |
| 0.67 | 72.5 | 150.0 |
| 0.65 | 80.0 | 150.0 |
| 0.60 | 100.0 | 150.0 |

| | Dilutional failure | |
|---|---|---|
| Dilution Factor | ul water | ul fully active formulation |
| b) Dilutional failure | | |
| 1.00 | 0.0 | 150.0 |
| 0.79 | 40.0 | 150.0 |
| 0.75 | 50.0 | 150.0 |
| 0.72 | 57.5 | 150.0 |
| 0.70 | 65.0 | 150.0 |
| 0.67 | 72.5 | 150.0 |
| 0.65 | 80.0 | 150.0 |
| 0.60 | 100.0 | 150.0 |

Immediately after performing dilutions of the 3% peracetic acid formulation, 100 ul portions of each dilution are transferred to a corresponding 96 well plates with 100 ul color indicator solution for the endpoint analysis detailed in the next step (Section 2.2). In addition, 20 ul portions of each dilution are transferred to a separate 96 well plate for ABTS-based quantification of peracetic acid levels as detailed in Section 2.3.

2.2. Reaction of Peracetic Acid Formulation with Color Indicator Solution

Next, 100 ul portions of color indicator solution are added to wells of 96 well plate. The reaction between color indicator solution and peracetic acid formulation is then initiated by adding 100 ul of each peracetic acid formulation from the last step (2.1) to the 100 ul of color indicator solution. This is accomplished in a simultaneous manner with a multi-channel pipette. The clear-green endpoint was assessed as detailed in Example 1, Section 2.2.

Two sources of error are considered:
a) The standard deviation from the error in the calculation of peracetic acid concentrations in the two wells that "bracket" the green-clear endpoint ($\delta[paa]_{ABTS}$). This value is taken as the standard deviation between replicate (e.g., triplicate) values from the ABTS determination method.

b) An estimation uncertainty due to the spread in peracetic acid values between green and clear wells that bracket the endpoint ($\delta[paa]_{estimate}$). This error reflects the fact that the actual endpoint is an undetermined value that is somewhere between the midpoint concentration between cut-off wells and the concentration in the actual wells.

The total error ($\delta[paa]_{total}$) is thus taken as the sum of the peracetic acid determination error and the estimation uncertainty:

$$\delta[paa]_{total} = \delta[paa]_{ABTS} + \delta[paa]_{estimate}$$

This total error is the value that is reported for each endpoint determination, averaged to obtain an average error and coefficient of variation, and used in t-test comparisons for statistical significance.

3. Results 3.1 Testing with Potency Failure and Potency Dilution Peracid Conditions Replicate evaluations are performed with twelve spent peracetic acid formulations (for potency failure) and twelve water diluted formulations (for dilutional failure). Results are averaged to obtain a mean value and related standard deviation. Results are tabulated here.

TABLE 3.1a

Precision Testing: "Potency failure" conditions

| Replicate Number n = 18 | Clear - Green Transition Endpoint | $\delta[paa]_{total}$ |
|---|---|---|
| 1 | 2242 | 59 |
| 2 | 2242 | 59 |
| 3 | 2165 | 115 |
| 4 | 2242 | 59 |
| 5 | 2242 | 59 |
| 6 | 2165 | 115 |
| 7 | 2243 | 117 |
| 8 | 2175 | 87 |
| 9 | 2173 | 87 |
| 10 | 2220 | 117 |
| 11 | 2220 | 117 |
| 12 | 2220 | 117 |
| 13 | 2350 | 114 |
| 14 | 2394 | 114 |
| 15 | 2330 | 104 |
| 16 | 2280 | 104 |
| 17 | 2330 | 104 |
| 18 | 2330 | 104 |
| Mean = 2254 ppm | | Average $\delta[paa]_{total}$ = 97 ppm Standard Dev of each replicate from mean = 66 ppm CV based on St Dev. = 2.9% |

TABLE 3.1b

Precision Testing: "Potency dilution" conditions

| Replicate Number n = 18 | Clear - Green Transition Endpoint | $\delta[paa]_{total}$ |
|---|---|---|
| 1 | 2242 | 97 |
| 2 | 2242 | 97 |
| 3 | 2203 | 140 |
| 4 | 2242 | 97 |
| 5 | 2242 | 97 |
| 6 | 2242 | 97 |
| 7 | 2122 | 24 |
| 8 | 2200 | 44 |
| 9 | 2173 | 26 |
| 10 | 2173 | 26 |
| 11 | 2173 | 26 |
| 12 | 2122 | 26 |
| 13 | 2350 | 114 |
| 14 | 2300 | 104 |
| 15 | 2400 | 114 |
| 16 | 2410 | 114 |
| 17 | 2410 | 114 |
| 18 | 2450 | 114 |
| Mean = 2272 ppm | | Average $\delta[paa]_{total}$ = 82 ppm Standard Dev of each replicate from mean = 104 ppm CV based on St Dev. = 4.5% |

3.2. Comparison of "Potency Failure" and "Potency Dilution" Conditions

The statistical significance of the difference between green to colorless endpoints is tested with the data sets in Tables 3.1a. and 3.1b. by calculating the two-tailed P-value with a two-sample T-test. This calculation demonstrated that chemical indicator solution returned similar cut-off values in when diluted with either spent peracetic acid formulation or potable water; conditions that respectively mimic "potency failure" and "potency dilution" conditions.

TABLE 3.2

Validity of assay with different fault conditions

| Replicate Number (n = 18 each) | Clear - Green Transition Endpoint | Standard deviation from mean | P value (Is difference significant?) |
|---|---|---|---|
| "Potency failure" conditions | 2254 ppm | 66 ppm | P = 0.496 (difference is not significant) |
| "Potency dilution" conditions | 2274 ppm | 104 ppm | |

Example 3

Interference from Hydrogen Peroxide

The effect of doubling the hydrogen peroxide on an endpoint value of the color indicator solution was ascertained. The maximal hydrogen peroxide level in peracetic acid formulations as described in Table 1 was found to increase from 25 mM to 50 mM if stored in the dried-solid state for six months at 30° C. The effect of hydrogen peroxide at these low and high contrations (25 mM and 50 mM) on peracid endpoint values were assessed. For this analysis the procedure for evaluating the cut-off values outlined in Example 2 were followed, with the analysis being performed with a lot of peracetic acid formulation that was found to generate 25 mM hydrogen peroxide and second lot of peracetic acid that was held at 30° C. that generated 50 mM hydrogen peroxide. The findings summarized in the following Table 1. "Interference from Hydrogen Peroxide" indicates that $H_2O_2$ does not strongly affect the chemical indicator color solution with the utilized procedures.

TABLE 1

Interference from Hydrogen Peroxide

| Replicate Number (n = 12) | Clear - Green Transition Endpoint | $\delta[paa]_{total}$ | P value (Is difference significant?) |
|---|---|---|---|
| 50 mM $H_2O_2$ | 2243 ppm | 93 ppm | P = 0.096 |
| 25 mM $H_2O_2$ | 2185 ppm | 68 ppm | (difference is not significant) |

It should be understood that "operatively coupled," when used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more."

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

What is claimed is:

1. An apparatus for determining concentrations of disinfectants, the apparatus comprising:
    a housing comprising:
        a first housing portion comprising a first fluid intake port, wherein the first fluid intake port is configured to receive a first fluid;
        a first fluid chamber formed by the first housing portion, wherein the first fluid chamber is configured to receive the first fluid through the first fluid intake port;
        a first piston oriented to extend into and withdraw from the first fluid chamber;
        a second housing portion comprising a second fluid intake port, wherein the second fluid intake port is configured to receive a second fluid;
        a second fluid chamber formed by the second housing portion, wherein the second fluid chamber is configured to receive the second fluid through the second fluid intake port;
        a second piston oriented to extend into and withdraw from the second fluid chamber; and
    one or more walls forming a mixing cavity, wherein, the mixing cavity is configured to receive the first fluid from the first fluid chamber and the second fluid from the second fluid chamber to form a fluid mixture.

2. The apparatus of claim 1, further comprising:
    a sensor operatively coupled to the mixing cavity, wherein the sensor is configured to detect a concentration of a chemical within the fluid mixture within the mixing cavity.

3. The apparatus of claim 2, wherein the sensor is a color sensor configured to detect absorbance of the fluid mixture at specified wavelengths to determine a color of the fluid mixture.

4. The apparatus of claim 2, wherein the mixing cavity is formed by at least a portion of the sensor and is located apart from the housing.

5. The apparatus of claim 2, wherein the mixing cavity is formed by at least a portion of the housing.

6. The apparatus of claim 1, wherein the mixing cavity is located outside of the housing.

7. The apparatus of claim 1, wherein the first piston and the second piston are mounted on a mounting block, wherein the mounting block is coupled to a shaft, wherein the shaft is coupled to a mechanical actuator.

8. The apparatus of claim 1, wherein the housing further comprises:
    one or more limits switches configured to signal a limit of travel of the first piston or the second piston.

9. The apparatus of claim 1, wherein the first housing portion further comprises a third fluid intake port, wherein the first fluid chamber receives the second fluid through the second fluid intake port.

10. The apparatus of claim 9, wherein one or more valves are configured to regulate when the first fluid chamber receives the first fluid or the second fluid.

11. The apparatus of claim 2, wherein the housing further comprises a fluid viewport, wherein the fluid viewport provides a view of the mixing cavity, and wherein the sensor comprises a color sensor printed circuit board (PCB) configured to detect a color of the fluid mixture through the fluid viewport.

12. A system for determining concentrations of disinfectants, the system comprising:
    an apparatus fluidly coupled to a first fluid source via a first fluid line through a first fluid intake port and to a second fluid source via a second fluid line through a second fluid intake port, wherein the apparatus is configured to receive a first fluid from the first fluid source and a second fluid from the second fluid source; wherein the apparatus comprises a housing and one or more walls forming a mixing cavity, the housing comprising:
        a first fluid chamber formed by a first housing portion, wherein the first fluid chamber receives the first fluid through the first fluid intake port;
        a first piston oriented to extend into and withdraw from the first fluid chamber;
        a second fluid chamber formed by a second housing portion, wherein the second fluid chamber receives the second fluid through the second fluid intake port;
        a second piston oriented to extend into and withdraw from the second fluid chamber; and
    wherein the mixing cavity receives the first fluid from the first fluid chamber and a second fluid from the second fluid chamber to form a fluid mixture; and
    a sensor operatively coupled to the apparatus, wherein the sensor is configured to detect a concentration of a chemical within the fluid mixture created by mixing the first fluid with the second fluid.

13. The system of claim 12, wherein the sensor is a color sensor configured to detect absorbance of the fluid mixture at specified wavelengths to determine a color of the fluid mixture.

14. The system of claim 12, wherein the mixing cavity is formed within the sensor, or wherein the mixing cavity is formed within the housing.

15. A method for determining concentrations of disinfectants, the method comprising:
receiving a first fluid in a first fluid chamber through a first fluid intake port located within a first housing portion of a housing, wherein receiving the first fluid comprises actuating a first piston to draw the first fluid into the first fluid chamber;
receiving a second fluid in a second fluid chamber through a second fluid intake port located within a second housing portion of the housing, wherein receiving the second fluid comprises actuating a second piston to draw the second fluid into the second fluid chamber;
mixing the first fluid with the second fluid in a mixing cavity formed from one or more walls to create a fluid mixture, wherein creating the fluid mixture comprises actuating the first piston and the second piston to expel the first fluid from the first fluid chamber and the second fluid from the second fluid chamber through one or more outlet ports and into the mixing cavity;
detecting, via a sensor, a color of the fluid mixture; and
based on detecting the color of the fluid mixture, determining a concentration of a chemical within the fluid mixture.

16. The method of claim 15, further comprising:
a priming phase, wherein the priming phase comprises:
opening a first solenoid valve operatively coupled to a first fluid source and closing a second solenoid valve operatively coupled to a second fluid source; and
actuating a pump to fill a first fluid line with the first fluid; and
a purging phase, wherein the purging phase comprises:
closing the first solenoid valve operatively coupled to the first fluid source and opening the second solenoid valve operatively coupled to the second fluid source; and
actuating the pump to expel fluids from the first fluid chamber and the second fluid chamber.

17. An apparatus for determining concentrations of disinfectants, the apparatus comprising:
a housing comprising:
a first housing portion comprising a first fluid intake port, wherein the first fluid intake port is configured to receive a first fluid;
a first fluid chamber formed by the first housing portion, wherein the first fluid chamber comprises:
a first measuring cavity; and
a first residue cavity;
wherein the first measuring cavity of the first fluid chamber is configured to receive the first fluid from the first fluid intake port and wherein the first residue cavity is configured to capture an overflow of the first fluid from the first measuring cavity of the first fluid chamber when the housing is oriented in a first orientation;
a second housing portion comprising a second fluid intake port, wherein the second fluid intake port is configured to receive a second fluid;
a second fluid chamber formed by the second housing portion, wherein the second fluid chamber comprises:
a second measuring cavity; and
a second residue cavity;
wherein the second residue cavity of the second fluid chamber is configured to receive the second fluid from the second fluid intake port and wherein the second residue cavity captures an overflow of the second fluid from the second measuring cavity of the second fluid chamber when the housing is oriented in the first orientation;
a divider, wherein the first housing portion and the second housing portion are operatively coupled and separated by the divider;
a mixing cavity formed from one or more walls and operatively coupled to the first chamber and the second chamber; and
wherein the mixing cavity receives the first fluid from the first measuring cavity and receives the second fluid from the second measuring cavity when the housing is oriented in a second position for mixing of the first fluid and the second fluid to form a fluid mixture.

18. The apparatus of claim 17, further comprising:
a sensor operatively coupled to the mixing cavity, wherein the sensor is configured to detect a concentration of a chemical within the fluid mixture within the mixing cavity.

19. The apparatus of claim 18, wherein the sensor is a color sensor configured to detect absorbance of the fluid mixture at specified wavelengths to determine a color of the fluid mixture.

* * * * *